United States Patent
Liaw et al.

(10) Patent No.: US 10,528,442 B2
(45) Date of Patent: *Jan. 7, 2020

(54) SYSTEMS AND METHODS FOR MANAGING A CLUSTER OF CACHE SERVERS

(71) Applicant: MZ IP Holdings, LLC, Palo Alto, CA (US)

(72) Inventors: Eric Liaw, Cupertino, CA (US); Kevin Xiao, Saratoga, CA (US); Glen Wong, Sunnyvale, CA (US)

(73) Assignee: MZ IP Holdings, LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,534

(22) Filed: Dec. 19, 2018

(65) Prior Publication Data

US 2019/0121712 A1    Apr. 25, 2019

Related U.S. Application Data

(63) Continuation of application No. 15/783,537, filed on Oct. 13, 2017, now Pat. No. 10,191,824.

(Continued)

(51) Int. Cl.
*G06F 11/00* (2006.01)
*G06F 11/20* (2006.01)
(Continued)

(52) U.S. Cl.
CPC ...... *G06F 11/2094* (2013.01); *G06F 12/0848* (2013.01); *G06F 12/128* (2013.01);
(Continued)

(58) Field of Classification Search
CPC ............. G06F 11/2094; G06F 11/2089; G06F 11/2092; G06F 11/3003; G06F 11/3006;
(Continued)

(56) References Cited

U.S. PATENT DOCUMENTS 9,317,384 B2 * 4/2016 Cen ................... H04L 29/08729
2010/0299553 A1 * 11/2010 Cen ................... H04L 29/08729
714/4.1

FOREIGN PATENT DOCUMENTS

CN    105554106 A    5/2016

OTHER PUBLICATIONS

Posting for "twemproxy" on GitHub website <URL:https://github.com/twitter/twemproxy>, uploaded on Oct. 18, 2016. Retrieved from Internet via Internet Archive Wayback Machine: <https://web.archive.org/web/20161018235547/https://github.com/twitter/twemproxy>. (Year: 2016).*

(Continued)

*Primary Examiner* — Anthony J Amoroso
(74) *Attorney, Agent, or Firm* — Goodwin Procter LLP

(57) ABSTRACT

Implementations of this disclosure are directed to systems, devices and methods for implementing a cache data management system. Webserver computers receive cache data requests for data stored at a computer cluster comprising a plurality of master cache data server computers that do not have corresponding slave cache data server computers to store reserve cache data. Proxy computers in communication with the plurality of webserver computers and the computer cluster route the cache data requests from the webserver computers to the computer cluster. Each proxy computer includes a sentinel module to monitor a health of the computer cluster by detecting failures of master cache data server computers and a trask monitor agent to manage the computer cluster. In response to the sentinel module detecting a failed master cache data server computer, the trask monitor agent replaces the failed master cache data server computer with a substantially empty reserve master cache data server computer, which is subsequently populated with the reserve cache data from a master database.

20 Claims, 19 Drawing Sheets

Related U.S. Application Data

(60) Provisional application No. 62/413,639, filed on Oct. 27, 2016.

(51) Int. Cl.
*G06F 16/2455* (2019.01)
*G06F 12/0846* (2016.01)
*G06F 12/128* (2016.01)

(52) U.S. Cl.
CPC .. *G06F 16/24552* (2019.01); *G06F 2201/805* (2013.01); *G06F 2201/82* (2013.01); *G06F 2212/282* (2013.01); *G06F 2212/621* (2013.01)

(58) Field of Classification Search
CPC ........... G06F 16/24552; G06F 12/0848; G06F 12/128; G06F 12/0846; G06F 12/12; G06F 2201/805; G06F 2201/82; G06F 2212/282; G06F 2212/621; G06F 2212/283; G06F 2212/284
See application file for complete search history.

(56) References Cited

OTHER PUBLICATIONS

"Redis Sentinel Documentation," uploaded on Oct. 10, 2016 at <URL:https://redis.io/topics/sentinel>. Retrieved from Internet via Internet Archive Wayback Machine: <https://web.archive.org/web/20161010201341/https://redis.io/topics/sentinel>. (Year: 2016).*
"Apache ZooKeeper," accessed on the internet at: http://zookeeper.apache.org/ downloaded Oct. 9, 2018, 2 pages.
"Asynchronous replication with failover," accessed on the internet at: "https://aphyr.com/posts/287-asynchronous-replication-with-failover" downloaded Oct. 9, 2018, 8 pages.
"GitHub—adjust/redis_failover: redis failover scripts," accessed on the internet at: "https://github.com/adjust/redis_failover" downloaded on Oct. 9, 2018, 2 pages.
"GitHub—areina/smitty: Agent for twemproxy to work with a redis sentinel (master-slave) stack," "https://github.com/areina/smitty" downloaded Oct. 9, 2018, 3 pages.
"Jepsen: Redis," accessed on the internet at: "https://aphyr.com/posts/283-call-me-maybe-redis" downloaded Oct. 9, 2018, 9 pages.
"My bad opinions—Queues Don't Fix Overload," posted on the internet on Nov. 19, 2014 at: http://ferd.ca/queues-don-t-fix-overload.html downloaded Oct. 9, 2018, 7 pages.
"Redis Sentinel at Flickr," posted on the internet Jul. 31, 2014, by Richard "Hammertime" Thorn and Shawn "The F-Train" Cook at: http://code.flickr.net/2014/07/31/redis-sentinel-at-flickr/, downloaded Oct. 9, 2018, 9 pages.
"Redis Sentinel Documentation," accessed on the internet at: "http://redis.io/topics/sentinel" http://redis.io/topics/sentinel, downloaded Oct. 9, 2018, 31 pages.
"Redis Sentinel Documentation," uploaded on Oct. 10, 2016 at Retrieved from Internet via Internet Archive Wayback Machine: "https://web.archive.org/web/20161010201341/https://redis.io/topics/sentinel" (Year: 2016).
"Reply to Aphyr attack to Sentinel," accessed on the internet: "http://antirez.com/news/55" downloaded Oct. 9, 2018, 6 pages.
Aslett, Matthew, "How to to provide a strongly consistent distributed database and not break CAP Theorem," https://blogs.the451group.com/information_management/2011/12/14/newsql-cap-theorem-and-latency-tolerance/, posted on Dec. 14, 2011, downloaded Oct. 9, 2018, 8 pages.
International Search Report and Written Opinion from corresponding International Application No. PCT/US2017/058249 dated Feb. 2, 2018.
Nishtala, et al., "Scaling Memcache at Facebook," accessed at: https://www.usenix.org/conference/nsdi13/technical-sessions/presentation/nishtala, downloaded Oct. 9, 2018, 3 pages.
Posting for "twemproxy" on GitHub website uploaded on Oct. 18, 2016. Retrieved from Internet via Internet Archive Wayback Machine: "https://web.archive.org/web/20161018235547/https://github.com/twitter/ twemproxy" (Year: 2016).
Rajesh Nishtala, et al., "Scaling Memcache at Facebook," 10th USENIX Symposium on Networked Systems Design and Implementation (NSDI '13), Apr. 2-5, 2013, pp. 385-398.
Xu, et al., "Tulip: A New Hash Based Cooperative Web Caching Architecture," The Journal of Supercomputing, Kluwer Academic Publishers, Mar. 2006; 35(3): 301-320.

* cited by examiner

SYSTEMS AND METHODS FOR MANAGING A CLUSTER OF CACHE SERVERS

CROSS-REFERENCE TO RELATED APPLICATIONS

This application is a continuation of U.S. application Ser. No. 15/783,537, filed on Oct. 13, 2017, which claims the benefit of U.S. provisional patent application Ser. No. 62/413,639, filed on Oct. 27, 2016, the entire disclosure of each of which is incorporated by reference herein.

FIELD OF THE INVENTION

In general, embodiments of this disclosure relate to management of a cluster of data servers in a high-transaction, high-availability environment and, in particular, to systems and methods for improving the reliability and response times in instances of server failover.

BACKGROUND

There are a wide variety of ways of storing data persistently, particularly with cloud-based systems. These include file systems, relational databases (e.g., DB2, MySQL, SQL Server), and NoSQL systems.

The emergence and popularity of in-memory NoSQL databases (often interpreted as "not only SQL" where SQL refers to structured query language) can be attributed to the flexible data model and the huge performance gain they provide as compared with a traditional relational database management system (RDBMS). In particular, NoSQL databases adopt flexible, schema-less data models, which ease application usage and fit well to the needs of many applications. In addition, by relaxing the stringent design properties required by traditional RDBMS, NoSQL databases can often benefit from a less sophisticated design architecture, which yields much greater performance as the database scales. As a result, open-source and proprietary NoSQL data stores such as Memcached, Redis, Voldemort, MongoDB and Couchbase have gained huge grounds in terms of market adoption in recent years.

Redis is a memory-based key-value database, which is commonly used for constructing high-performance and extensible distributed application systems that include one or more servers (a "cluster") and multiple clients. By using Redis with an application server, the application server can be connected to a service node in the Redis server cluster through the client to read or write data. The client is connected to a particular service node in the server cluster according to pre-defined configuration information at the application server.

Detecting and managing failovers and replication events is a critical component of operating such an environment. For example, use of a cluster of Redis databases as "cache servers" can increase the availability of, and speed of access to, information stored in the database by providing access to frequently used data without having to access a persistent data store. In such a replicated distributed database there are often copies of the same information stored on servers that are not directly connected to one another, but which may be connected by one or more switches, dedicated lines, etc. Managing these relationships in real-time without sacrificing performance introduces certain architectural and operational challenges.

SUMMARY OF THE INVENTION

In accordance with various embodiments of the disclosed subject matter, methods, systems, and media for providing distributed database access, cache management, failover and monitoring are provided. The invention provides an intermediary data cache layer to manage application requests for application data such that a persistent data store need not be queried, and an agent to manage the coordination of the allocation and use of the cache server resources during failover and expansion of a cache server pool. Such an arrangement facilitates a more reliable and faster failover scenario, and further allows for rapid expansion of the cache server pool during demand spikes.

Therefore, in a first aspect of the invention, a cache data management system includes a plurality of webserver computers to handle cache data requests, a computer cluster comprising a plurality of master cache data server computers without a corresponding plurality of slave cache data server computers to store reserve cache data, and a plurality of proxy computers in communication with the plurality of webserver computers and the computer cluster that routes the cache data requests from the plurality of webserver computers to the computer cluster. Each proxy computer includes a sentinel module to monitor a health of the computer cluster and to detect failures of master cache data server computers, and a trask monitor agent to manage the computer cluster. In response to the sentinel module detecting a failed master cache data server computer, the trask monitor agent replaces the failed master cache data server computer with a substantially empty reserve master cache data server computer, which is subsequently populated with the reserve cache data from a master database.

In some embodiments of the cache data management system, each webserver computer may include a cache data request module. Each proxy computer may also include a plurality of cache data request distribution modules to route the cache data requests from the cache data request modules to a master cache data server computer. In some implementations, the cache data request distribution modules randomly route cache data requests among the master cache data server computers. The connection between the webserver computers and the proxy computers may be established upon receipt of a request for a cache key at the webserver computers. In some cases, the master cache data server computers store cache keys, and serve a selected cache key upon receipt of the routed cache data requests. The cache data management system may also, in some embodiments, include state monitoring servers to monitor the state(s) of the master cache data server computers, and/or select one of the proxy computers as a proxy leader.

In some implementations of the cache data management system, the master cache data server computers may be subdivided into server pools, and, in certain cases one or more substantially empty reserve master cache data server computers become operational to increase a size of the server pool. In some embodiments, the sentinel module discovers other sentinel modules monitoring a same instance of the master cache data server computers.

In another aspect, a method for managing cache data includes receiving cache data requests at one or more webserver computers, and routing the cache data requests from the webserver computers to the computer cluster using proxy computers in communication with the webserver computers and the computer cluster. The computer cluster includes master cache data server computers that do not correspond to particular slave cache data server computers that store reserve cache data, and each proxy computer includes a sentinel module to monitor a health of the computer cluster and a trask monitor agent to manage the computer cluster. The sentinel module detects failed master cache data server computer(s) and replaces using the trask monitor agent, the failed master cache data server computer with a substantially empty reserve master cache data server computer and populates the substantially empty reserve master cache data server computer with the reserve cache data from a master database.

In some embodiments of the method, each webserver computer includes a cache data request module and the cache data requests may be routed from the cache data request modules to one of the master cache data server computers. The routing may be predetermined (e.g., round-robin, sequential) or random. The method may also include establishing a connection between one of webserver computers and one of the proxy computers upon receipt of a request for a cache key at the webserver computers.

In some cases, the master cache data server computers store cache keys, and serve a selected cache key upon receipt of the routed cache data requests. The cache data management system may also, in some embodiments, include state monitoring servers to monitor the state(s) of the master cache data server computers, and/or select one of the proxy computers as a proxy leader.

In some implementations of the cache data management system, the master cache data server computers may be subdivided into server pools, and, in certain cases one or more substantially empty reserve master cache data server computers become operational to increase a size of the server pool. In some embodiments, the sentinel module discovers other sentinel modules monitoring a same instance of the master cache data server computers.

In another aspect, the invention may be implemented as a non-transitory computer-readable medium having instructions stored thereon that, when executed by one or more computer processors, cause the one or more computer processors to implement the systems and methods described herein.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
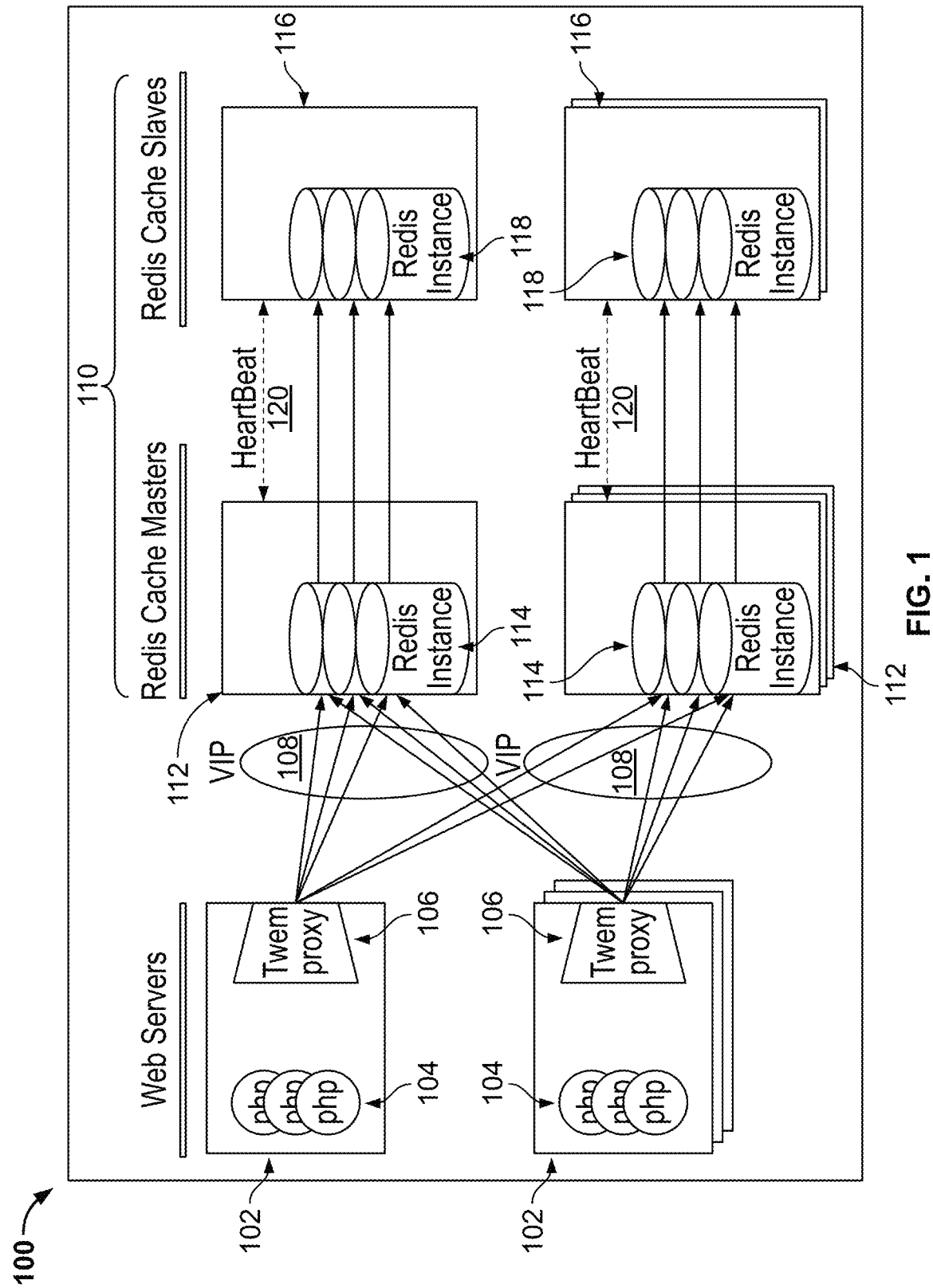
FIG. 1 illustrates one embodiment of a master/slave pair architecture of cache server instances serving requests from a collection of webservers.

FIG. 1 illustrates an architecture schematic for an implementation of a master/slave cache server allocation 100. Multiple web servers 102 each host one or more PHP worker instances 104 that process PHP requests for data, including, for example, stored key distribution. Each web server 102 includes a twemproxy instance 106 as a single-threaded proxy to support one or more caching protocols, including the Redis protocol. The twemproxy instances 106 connect to a cache virtual IP (VIP) module 108, which directs PHP requests from the web servers 102 to a cache master/slave pairing 110. In this example, the pairing of a cache master 112 with its cache slave 116 is fixed such that each database instance 114 on a particular cache master 112 is uniquely associated with a corresponding instance 118 on the paired cache slave 116.

In the event of a cache master 112 failure, a cache slave 116 recognizes that its master is not operational using a physical heartbeat cable connection 120, and takes over as the master cache server. The VIP module 108 then directs any subsequent PHP requests to the new master.

Such an implementation can result in undesirable circumstances, such as, for example, a split-brain scenario in which both the cache master 112 and the cache slave 116 act as the master due to network instability across the heartbeat cable connection 120. In the event of netsplits (across the server cluster and not between the master and slave), the system behaves as a CP system, where any instances outside of the partition will not be available, but maintain relative consistency as long as the heartbeat connection was not broken.

Figure 2:
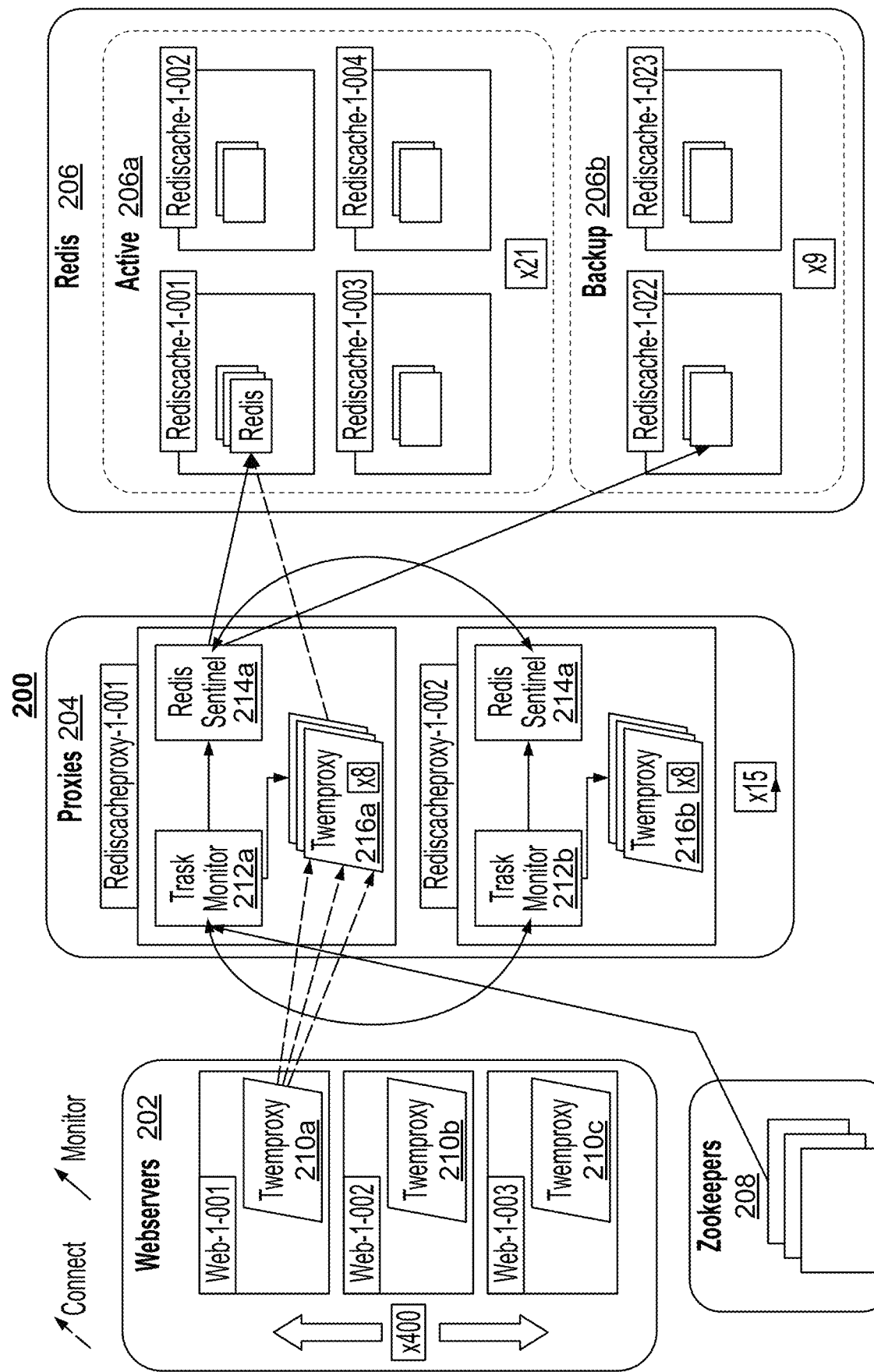
FIG. 2 illustrates a configuration of webservers, proxy servers and database hosts in accordance with one embodiment of the invention.

FIG. 2 illustrates one embodiment of a system that supports various methods and techniques that addresses these shortcomings. In one embodiment, a cache data management system 200 includes one or more webservers 202 and proxy machines 204 that coordinate cache requests to a pool or cluster of database hosts 206. The database hosts 206 can be further divided into active hosts 206a and backup or reserve hosts 206b. In certain implementations, one or more state monitoring servers or "zookeeper" cluster 208 provide status and priority data to the cache data management system 200.

The webservers 202 service application requests, and act as the clients of cache data management system 200. PHP workers resident on the webservers 202 receive application requests, such as a request for cache keys stored on the database hosts 206. When an application request is made, the PHP worker establishes a direct connection to a local twemproxy instance 216 (e.g., twemproxy instances 216a, 216b, etc.) residing on the proxy machines 204 instead of requiring a connection to a VIP. For certain cache requests, such as "deletes," the PHP worker may repeat failed attempts until successful, or until a threshold count is reached.

To manage the routing of the requests, each webserver 202 has a local twemproxy instance 210 (e.g., twemproxy instances 210a, 210b, 210c, etc.) that routes traffic from the webserver 202 to a selected database instance on the database hosts 206, and provides load balancing services across the proxy machines 204. For every cache request, the twemproxy instance 210 routes the request to a twemproxy instance 216 on a proxy machine 204 selected from its configured server pool. The selection of a particular proxy machine 204 may be random within a dedicated server pool. If any proxy machine 204 becomes unavailable, the twemproxy instance 210 may blackout that machine for a period of time until it is restarted or replaced.

In certain instances, the proxy machines 204 route traffic from the webservers 202 to the database hosts 206, performing key distribution in the process. Each proxy machine 204 hosts a trask (Twemproxy Redis Agent for Sentinel identified failbacK) monitor 212 and sentinel instance 214, which monitors the health of the database hosts 206. The trask monitor 212 manages the twemproxy instances 216, coordinates reloads, listens to the sentinel instance 214 for any changes in the status of the database hosts 206, distributes changes to twemproxy configurations, triggers reloads on the twemproxy instances 216 on the proxy machines 204, keeps track of the database hosts 206, and can perform other like functions. Because the twemproxy instances 216 distribute the keys according to its configured server pool, the twemproxy instances 216 generally maintain the same configured server pools.

The active hosts 206a serve traffic as the active server pool. Other reserve hosts 206b serve as backups. The external zookeeper cluster 208 operates as a centralized service for maintaining configuration information, naming, providing distributed synchronization, providing group services for the database hosts 206, and houses the state of the database hosts 206, as well as determining a proxy leader, among other functions.

In this embodiment of the cache data management system 200, there is no need for any master/slave relationships among database host machines, as the pool of reserve hosts 206b are available to replace a failed machine or to be used if the cluster size increases. Furthermore, the cache data management system 200 eliminates the need for heartbeat cables, allows for multiple, automatic failovers, reduces single pair failures, and improves overall tolerance for network instability.

In embodiments in which the database hosts 206 operate as a cache layer on top of or in conjunction with another permanent data store (e.g., My SQL or the like), any application requests that cannot be serviced using the cache layer can fall back to the permanent data store, thus allowing newly activated database hosts 206 from the pool of reserve hosts 206b to be instantiated as "empty" (or in some cases substantially empty) and populated post-activation using data from the permanent data store. In other words, the reserve hosts 206b do not need to maintain or otherwise store historical or reserve cache data.

To initiate the cache data management system 200, each database host 206 initiates one or more database instances. The zookeeper cluster 208 is started, and configurations for the trask monitors 212 and twemproxy instances (210 and 216) are provided to the webservers 202 and proxy machines 204. An initial sentinel configuration is sent to each proxy machine 204, and the sentinel instances 214 are initiated on each proxy machine 204. The trask monitors 212 are then started on each proxy machine 204. Each trask monitor 212 is in communication with the zookeeper cluster 208 and assigned to a cache database pool on the database hosts 206. Each twemproxy instance (210 and 216) is then started, and the twemproxy instances 210 on each webserver 202 are pointed to their corresponding twemproxy instance 216 on the proxy machines 204.

The sentinel instances 214 monitor the health of the database instances operating on the database hosts 206, reporting when an instance or a machine becomes unavailable. Each proxy machine 204 can host one sentinel instance 214 (although more than one sentinel instance 214 is possible), which is initiated prior to initiating the trask monitor 212. The sentinel instances 214 discover each other when they are monitoring the same cache database instance and communicate with each other to form a consensus regarding the status of the instance, e.g., whether it is operational or down. By having multiple sentinel instances 214 listening to the same database instance, the greater the sensitivity the sentinel instances 214 have to detecting that a database host 206 has failed. For example, a configuration file may be provided to the sentinel instance 214 that affects its monitoring activities. The sentinel instance 214 can also update its own configuration file when its state changes. However, in some instances any changes to the sentinel instance 214 monitoring tasks are provided by the trask monitor 212, which can synchronize the sentinel monitoring across its current cache pool.

FIGS. 3 through 12 illustrate techniques for addressing various failover scenarios according to various embodiments of the cache data management system 200.

Figure 3:
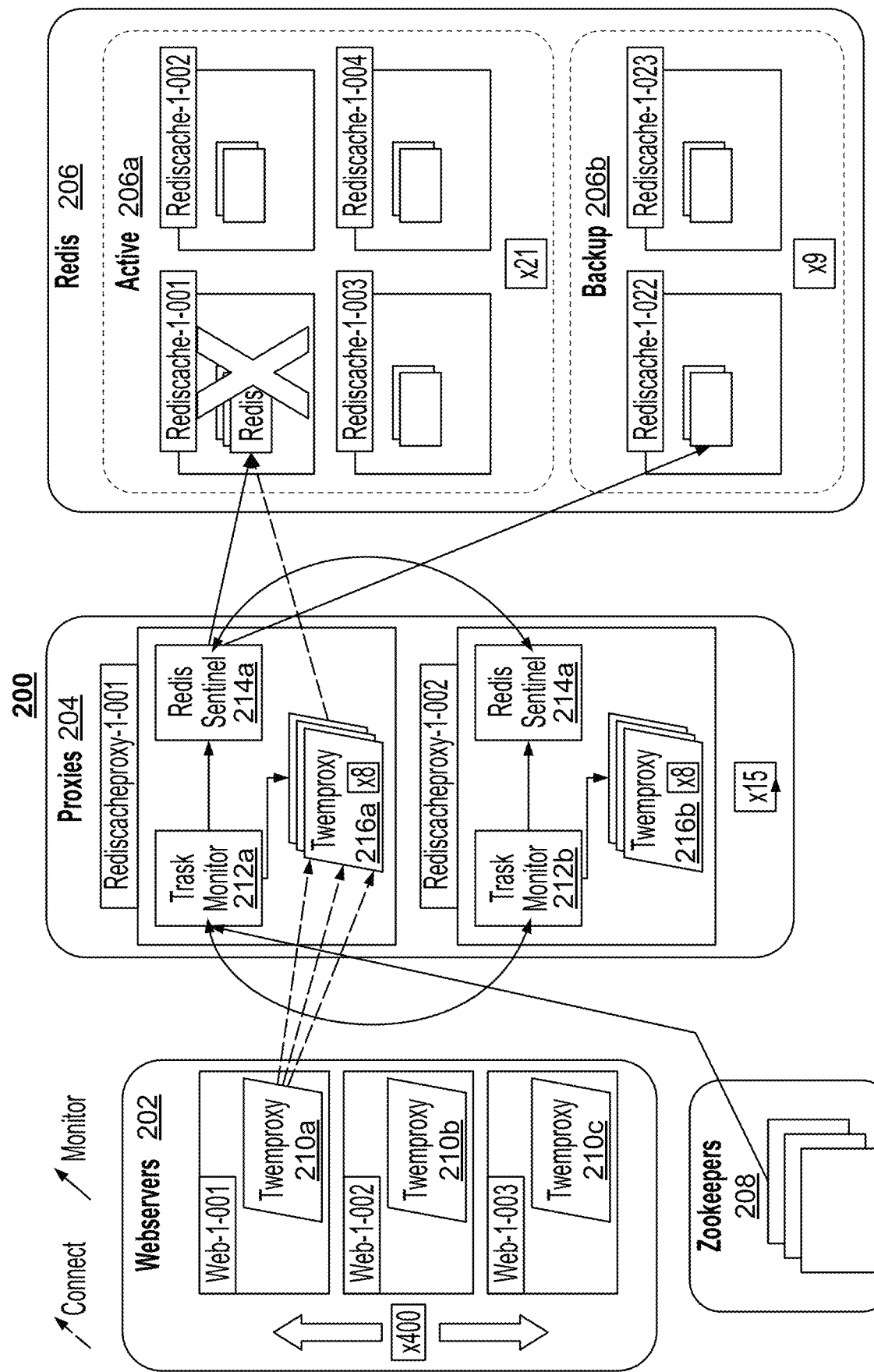
FIG. 3 illustrates a configuration of webservers, proxy servers and database hosts in which a database host becomes inactive in accordance with one embodiment of the invention.

FIG. 3 illustrates the processes used to address when a database host 206 becomes inactive in accordance with one embodiment of the invention. In such cases, application data requests that are requesting data (e.g., a key) stored at the failed cache machine go unanswered. The PHP workers fallback to using the underlying persistent database/data store to retrieve the requested keys, and, as a result, application response duration increases. When the failed cache machine is replaced, the newly operational machine is initially empty, but over time (usually within a matter of seconds) all or substantially all of the cached data is regenerated on the new cache host. If the automatic replacement gets blocked, application requests will continue to fallback to the persistent data store.

More specifically, the process for replacing a failed cache database server can proceed as follows:

A database host 206 fails, causing all application requests requesting keys on that machine to error.

The sentinel instance 214 marks the failed machine as down, broadcasting the change through the application.

The elected trask monitor 212 assigned to the corresponding application process receives a '+odown' or other suitable notification, kicking off a two-phase rolling restart to update the database cluster on that machine.

In the first phase, the leader trask monitor 212 updates the database pool, replacing the bad database host with blackout ports that reject all traffic addressed to that port. This guarantees that affected keys are no longer served by a cache backend, avoiding cache inconsistency if the machine did not actually fail, and was instead suffering intermittent connectivity issues.

The leader trask monitor 212 then messages other trask monitors 212 to update the twemproxy configurations based on the updated cache database pool, and coordinates with the other trask monitors 212 to perform a rolling restart on the twemproxy instances (210 and 216) to reload the updated configurations.

After the first phase has been completed, the leader trask monitor 212 updates the cache database pool again, replacing the blackout ports with the newly initiated backup host. The twemproxy configurations are updated, a rolling restart occurs again, and all shards in the cluster are available.

Figure 4:
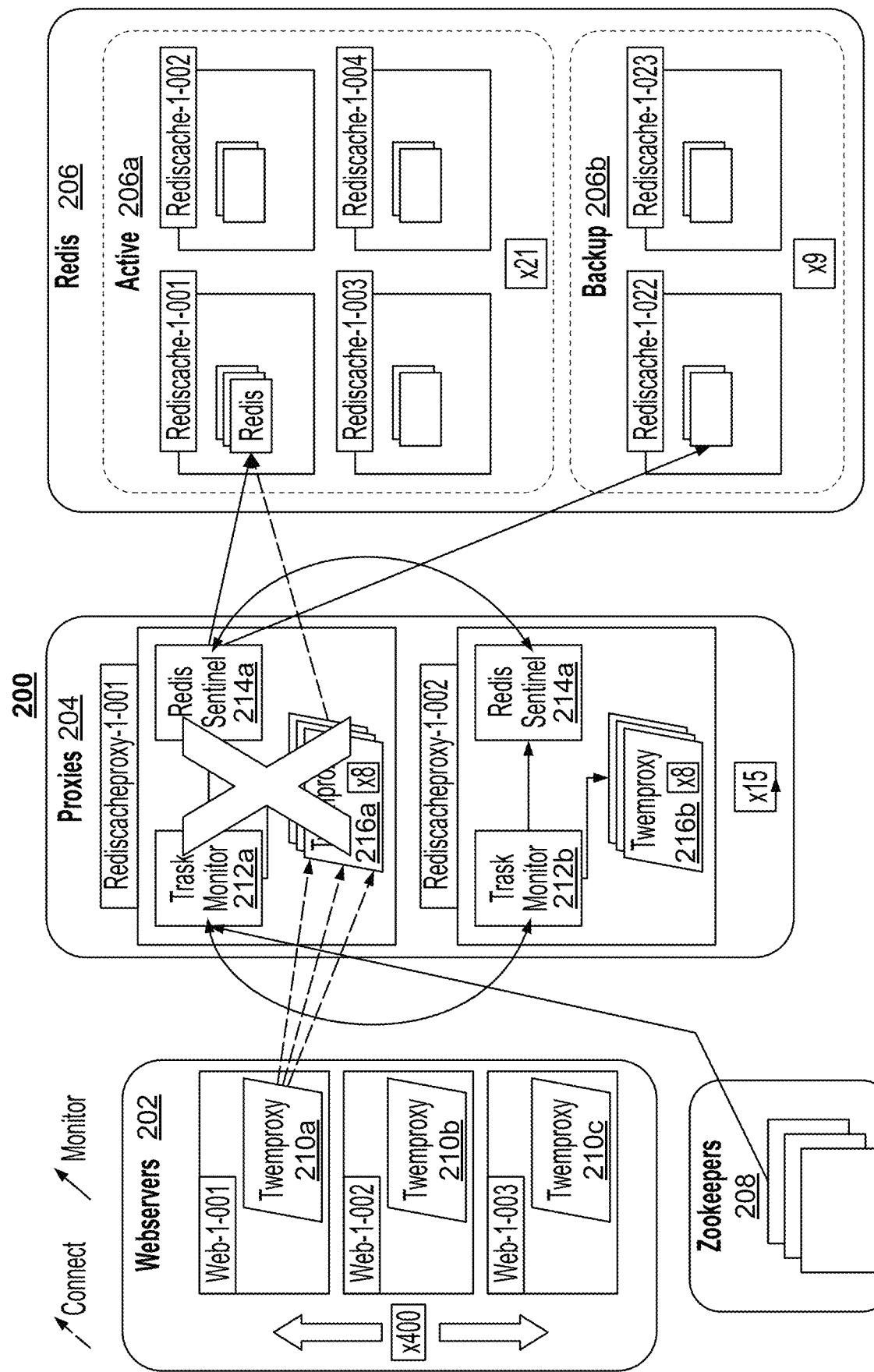
FIG. 4 illustrates a configuration of webservers, proxy servers and database hosts in which a proxy server becomes inactive in accordance with one embodiment of the invention.

FIG. 4 illustrates the processes used to address when a proxy machine 204 becomes inactive in accordance with one embodiment of the invention, causing a slight increase in application response duration. In such cases, the trask monitor 212 operating on that server is unable to reconfigure the twemproxy instances 216 on that server until the failed proxy recovers or is removed from the proxy configuration, blocking automatic cache reloads and requiring intervention to remove the proxy from the configuration.

In such cases, when a proxy machine 204 fails, all application requests routing through that machine return an error. After a certain number of errors occur, the corresponding webserver twemproxy instances 210 independently blacklist the downed proxy machine 204. If the proxy machine 204 automatically recovers, the webserver twemproxy instances 210 add the blacklisted proxy back as an active proxy; alternatively, the proxy machine 204 is removed from the proxy cluster. To remove the proxy machine 204 from the proxy cluster, the trask configurations are updated to remove the failed proxy machine 204 from the cluster. Updated trask configurations are then distributed to all of the proxy machines 204, and all trask monitors 212 are restarted with the updated trask configurations. This will return the proxy cluster to a good state, and replaces any invalid references to cache database hosts 206 if there are any accumulated while the proxy machine 204 was down. A rolling restart then updates the configurations for each of the corresponding webserver twemproxy instances 210.

If a proxy machine 204 must be removed from the proxy cluster, the proxy hostname is first removed from the trask configuration file. A modified trask configuration is deployed to all of the proxy machines 204 that are in the changed cluster, and all proxy instances are restarted. One of the proxy machines 204 verifies all remaining proxy machines 204 are operational and the twemproxy instances 216 on the machine being removed are removed from the server pool in the twemproxy configuration. The modified webserver twemproxy configuration is then deployed to all webservers 202 and a rolling restart is initiated on the webserver twemproxy instances 210.

If a proxy machine 204 fails, all application traffic is diverted away from the failed proxy machine 204 and routed to the remaining proxy machines 204. The trask monitor 212 on the failed proxy machine 204 is considered disconnected by all remaining trask monitors 212. If the failed trask monitor 212 was the leader, the zookeeper cluster 208 establishes a new leader within a matter of seconds. If any trask monitor 212 is in a disconnected state, reloads will be blocked, which will prevent automatic replacement of bad database hosts 206. The leader will continue attempting to query the status of each trask monitor 212, and as soon as all trask monitors 212 can communicate with the leader, the leader will complete the reload.

Figure 5:
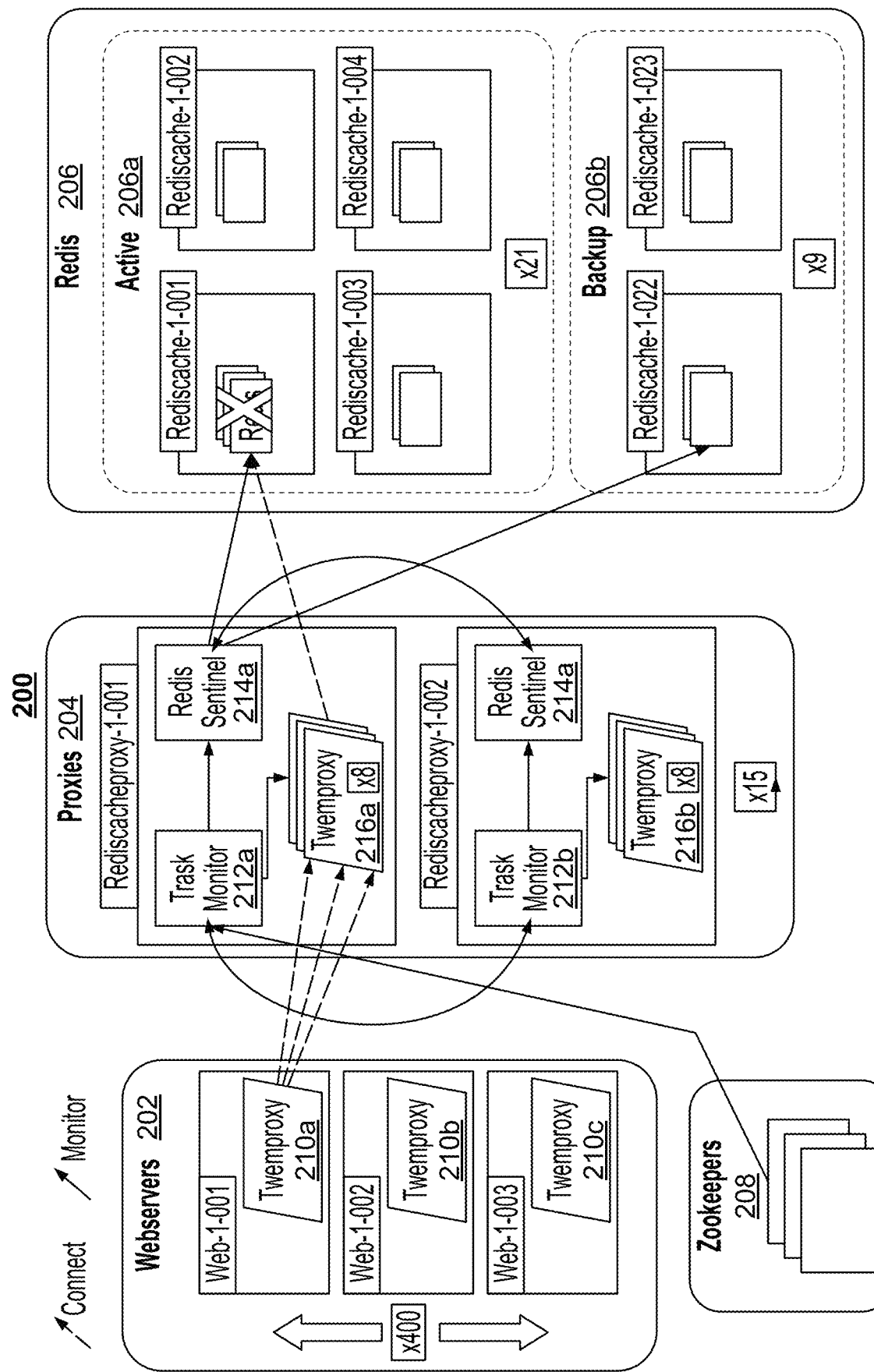
FIG. 5 illustrates a configuration of webservers, proxy servers and database hosts in which a database instance on a database host becomes inactive in accordance with one embodiment of the invention.

FIG. 5 illustrates the processes used to address when a database instance operating on a database host 206 becomes inactive in accordance with one embodiment of the invention. In certain embodiments, the sentinel instance 214 only monitors the first database instance on any given database host 206, and thus if any other instance fails, no changes are necessary. If the monitored instance fails, the sentinel instance 214 selects an alternative database host 206 to service incoming application requests.

Figure 6:
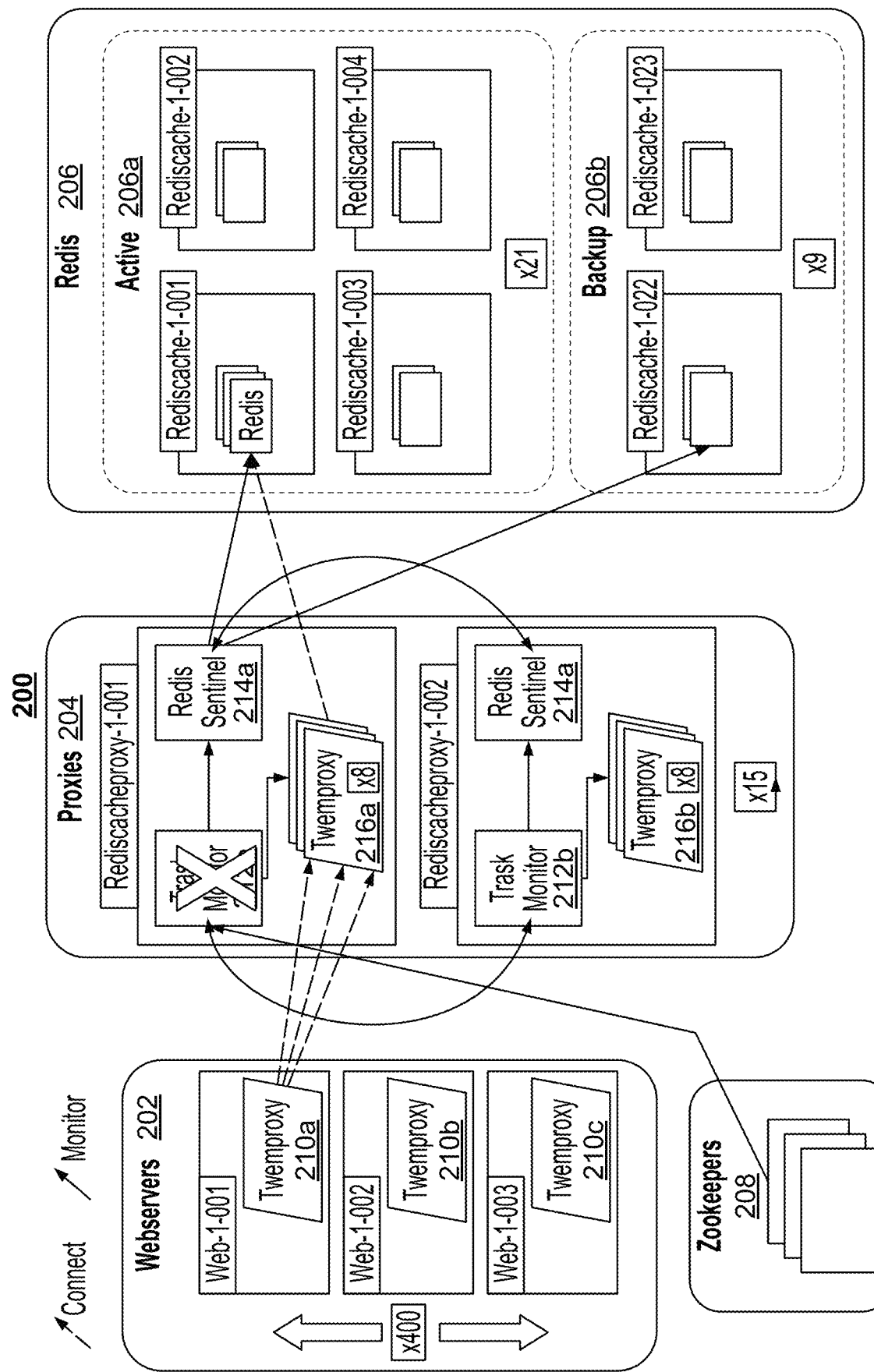
FIG. 6 illustrates a configuration of webservers, proxy servers and database hosts in which a trask monitor agent on a proxy host becomes inactive in accordance with one embodiment of the invention.

FIG. 6 illustrates the processes used to address when a trask monitor 212 operating on a proxy machine 204 becomes inactive in accordance with one embodiment of the invention, which causes the trask monitor 212 to become unable to serve trask commands. In such a case, all other trask monitors 212 will view the failed trask monitor 212 as disconnected. If the failed trask monitor 212 process was the leader, the zookeeper cluster 208 establishes a new leader after a few seconds. If any trask monitor 212 is in a disconnected state, reloads are blocked, which prevents automatic replacement of bad database hosts 206. The leader will continue attempting to query the status of each trask monitor 212, and when all trask monitor 212 can communicate with the leader, the leader will complete the reload.

Figure 7:
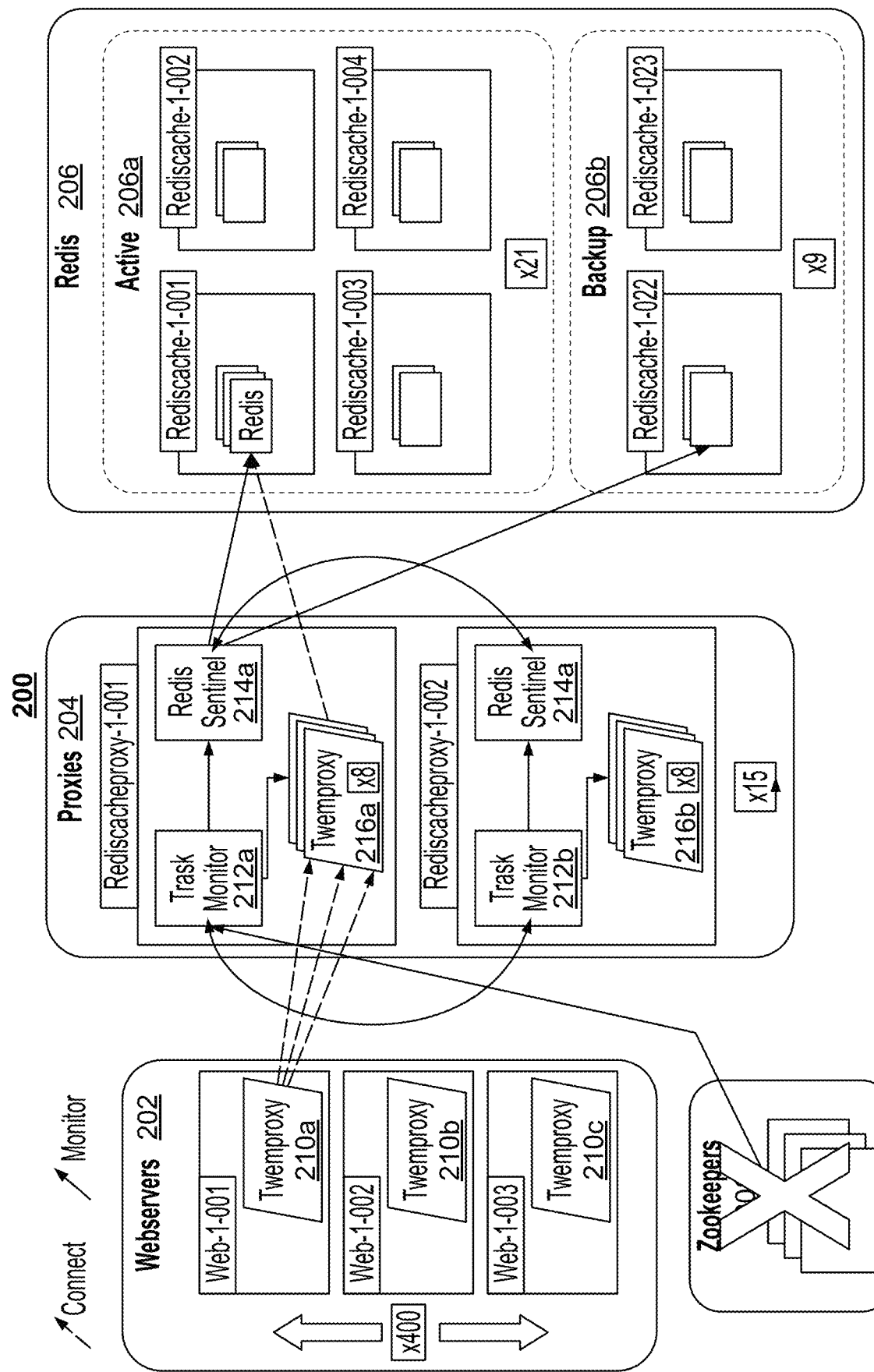
FIG. 7 illustrates a configuration of webservers, proxy servers and database hosts in which the state monitoring servers become inactive in accordance with one embodiment of the invention.

FIG. 7 illustrates the processes used to address when the zookeeper cluster 208 becomes inactive in accordance with one embodiment of the invention. A trask monitor 212 is considered unavailable if it cannot reach the zookeeper cluster 208, and thus unable to serve trask commands. All other trask monitors 212 will view it as in a disconnected state. If the trask monitor 212 was the leader, the zookeeper cluster 208 will establish a new leader after a few seconds, and the trask monitor 212 will repeatedly attempt to reconnect to the zookeeper cluster 208. If any trask monitor 212 is in a disconnected state, reloads are blocked, which prevent automatic replacement of failed database hosts 206. The leader continues to query the status of each trask monitor 212, and as soon as all trask monitors 212 can communicate with the leader, the leader completes the reload.

Figure 8:
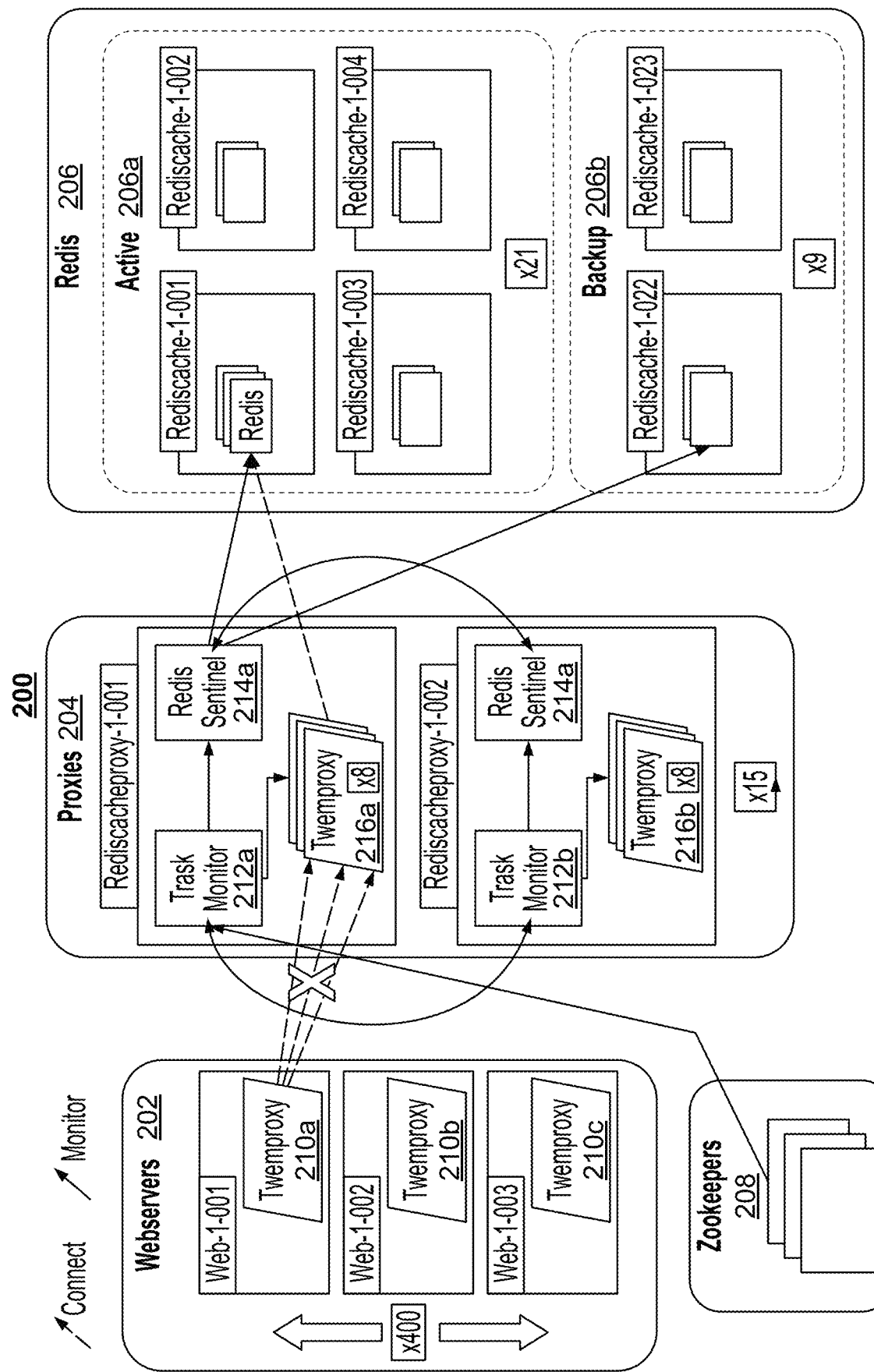
FIG. 8 illustrates a configuration of webservers, proxy servers and database hosts in which the communication between a webserver and a proxy server becomes inactive in accordance with one embodiment of the invention.

FIG. 8 illustrates the processes used to address when a netsplit occurs between a webserver 202 and a proxy machine 204 in accordance with one embodiment of the invention. This scenario is treated in the same manner as when a proxy machine 204 becomes unavailable to the webserver(s) 202 (see FIG. 4). In such cases, application traffic is routed to the available proxy machine 204 instead of the unavailable ones, and when the affected proxy machine(s) 204 become available, traffic to those servers is restored.

Figure 9:
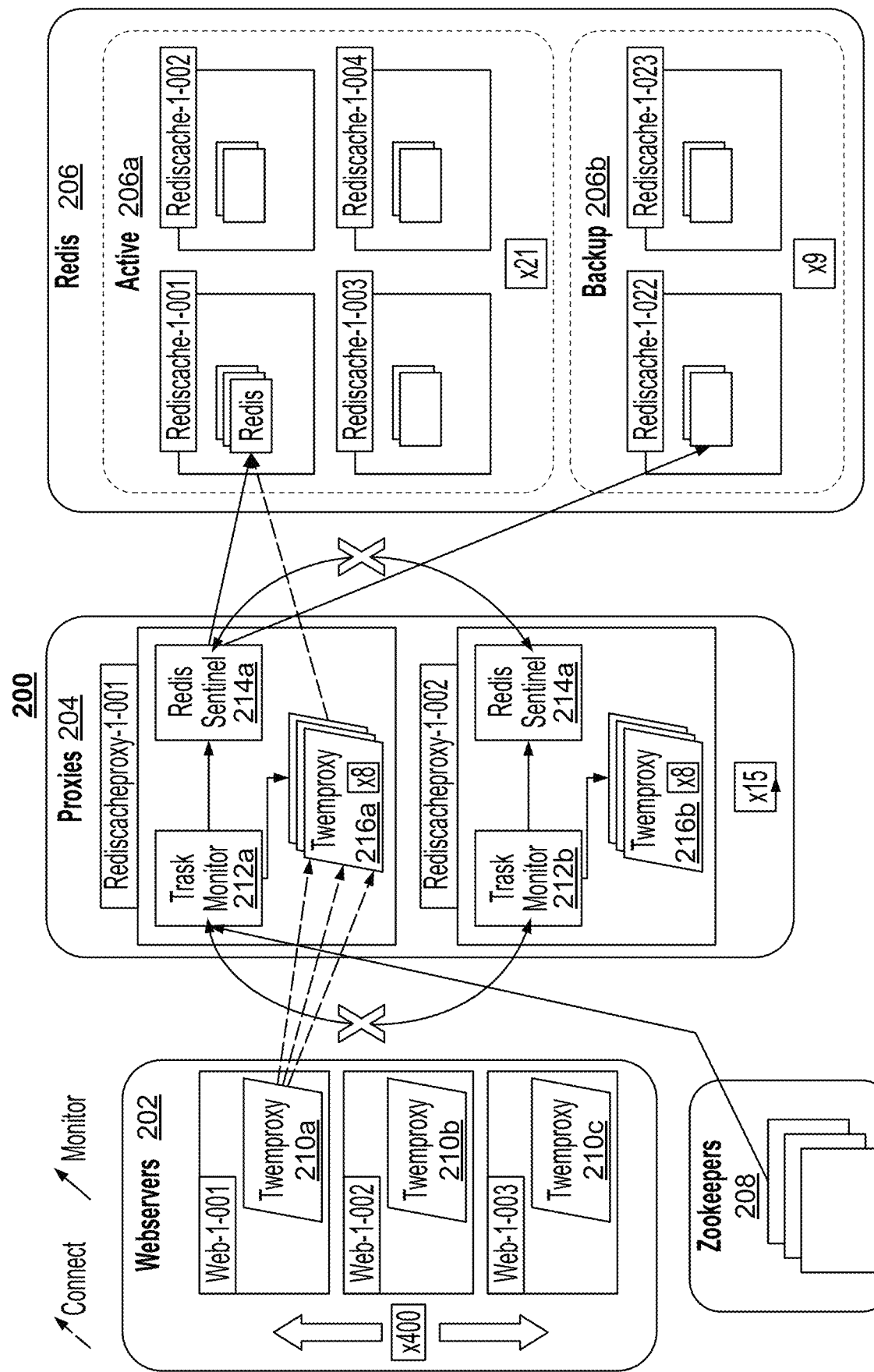
FIG. 9 illustrates a configuration of webservers, proxy servers and database hosts in which the communication among trask monitoring modules on proxy servers becomes inactive in accordance with one embodiment of the invention.

FIG. 9 illustrates the processes used to address when a netsplit occurs between the trask monitors 212 and sentinel instances 214 across proxy machines 204 in accordance with one embodiment of the invention. In such cases, the proxy machines 204 have differing views as to which modules remain connected. Proxy machines 204 in the majority cluster (i.e., the machines that remain in communication with a quorum of zookeeper machines in the zookeeper cluster 208) will view proxy machines 204 in the minority cluster as disconnected and vice-versa, and application traffic continues across each proxy machine 204 so there is no loss of throughput or impact on performance. However, because the leader is unable to automatically replace database hosts 206 when it cannot reach all the proxy machines 204, reloads are blocked. As soon as the leader can re-establish connection to all other trask monitors 212, it can continue reloads that have been blocked.

Figure 10:
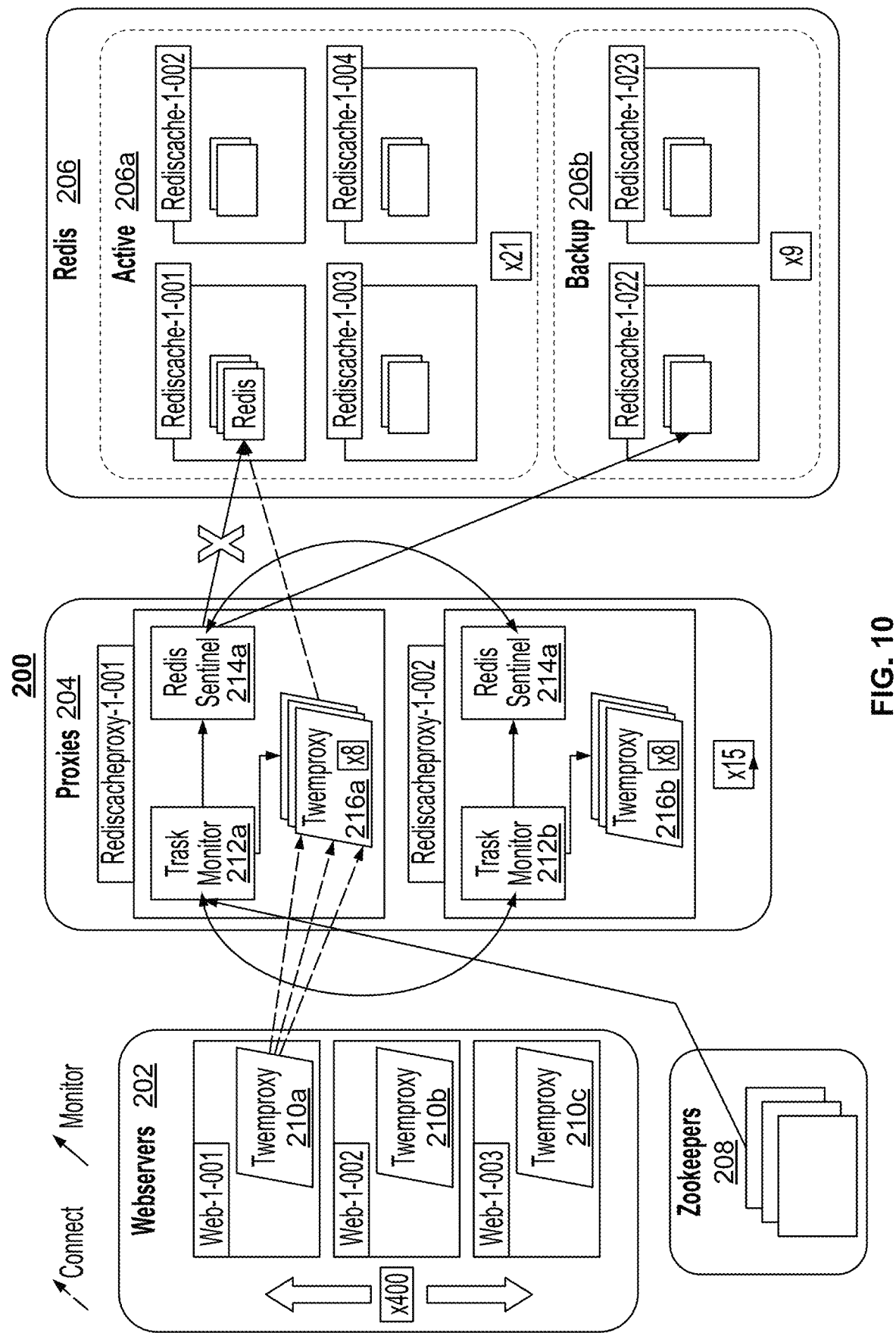
FIG. 10 illustrates a configuration of webservers, proxy servers and database hosts in which the communication between a proxy server sentinel module and an cache database instance on a database host becomes inactive in accordance with one embodiment of the invention.

FIG. 10 illustrates the processes used to address when a netsplit occurs between a proxy machine 204 and a database instance operating on a database host 206. If enough proxy machines 204 are disconnected from a database host 206, it will be considered down by the sentinel instance 214 operating on that proxy machine 204, and the trask monitor 212 will replace it with a reserve machine. In some instances, the reserve machine may be empty and subsequently populated with application data from the persistent database/data store. The number of proxies indicating a failed database server that is required to report a database server actually having failed may be based on, for example, a "quorum" configuration parameter in the trask configuration file. Other such configuration parameters are possible.

Figure 11:
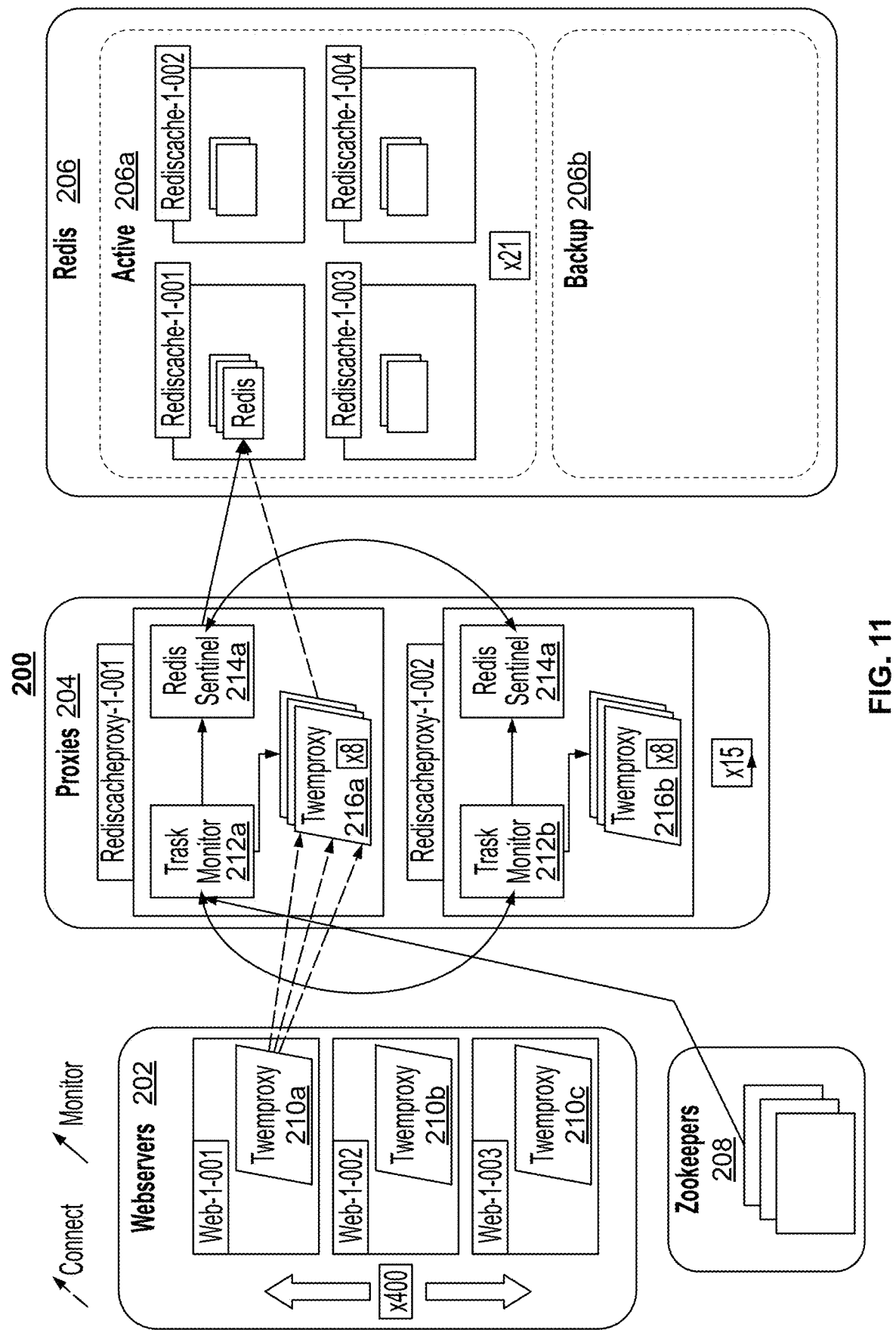
FIG. 11 illustrates a configuration of webservers, proxy servers and database hosts in which the pool of reserve servers is empty in accordance with one embodiment of the invention.

FIG. 11 illustrates the processes used to address when the pool of reserve cache database servers (i.e., backup or reserve hosts 206b) is empty in accordance with one embodiment of the invention. As no replacement can occur until there is an available reserve machine, the proxy machines 204 continue pointing to the unavailable cache database server. Any cache keys that map to that cache database server will have their requests fail, falling back to the persistent database/data store. Backup machines can then be added to the pool manually.

Figure 12:
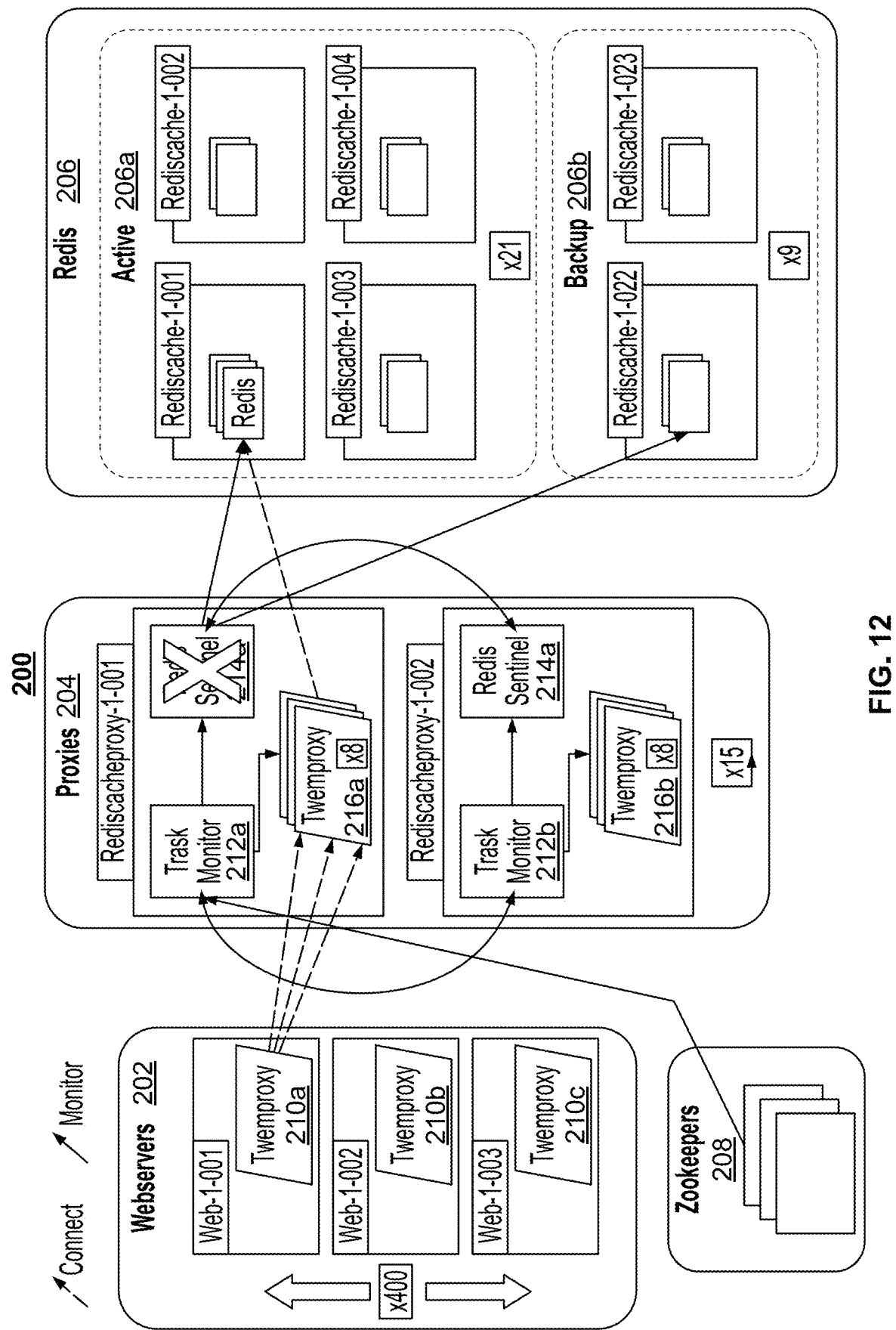
FIG. 12 illustrates a configuration of webservers, proxy servers and database hosts in which a proxy server sentinel module becomes inactive in accordance with one embodiment of the invention.

FIG. 12 illustrates the effect of a sentinel instance 214 on a proxy machine 204 becoming inactive in accordance with one embodiment of the invention. In such cases, the respective trask monitor 212 will be unable to start. Consequently, the proxy machine 204 on which the failed sentinel instance 214 resides will become unavailable and treated in the same fashion as the process outlined with respect to FIG. 4 above.

There are multiple configuration parameters used in the trask infrastructure, some required to be provided and others that can be automatically generated. Required configuration parameters can include, for example:

Web twemproxy configuration, which is located on the webservers 202 and points to twemproxy instances 212 on the proxy machines 204.

Trask configuration, which is located on the proxy machines 204 and used to configure the trask monitor 212.

Base twemproxy configuration, which is located on the proxy machine 204 and lists twemproxy options that are used for the generated proxy configuration parameters.

Sentinel configuration, which is located on the proxy machines 204 and used by the sentinel instance 214 to persist its state. An initial sentinel configuration is provided. Subsequently, the sentinel updates its configuration based on its state changes initiated by the trask monitor 212.

Database server pool configuration is stored at the zookeeper cluster 208 and represents the current cache database cluster state, including listing which database host 206 each shard is mapped to, and which database hosts 206 are identified as reserve hosts 206b.

Proxy twemproxy configurations are located on proxy machines 204 and generated by the trask monitor 212 from the base twemproxy configuration and the database server pool, and points to the database instances in the pool of active hosts 206a.

For purposes of illustration and not limitation, the twemproxy configuration parameters can be set as follows:

| Device | Configuration Parameter | Setting | Description/Reason |
|---|---|---|---|
| Proxy | Distribution | Modula | Modula facilitates constant runtime allocation |
| Proxy | Hash | fvn1a_64 | Marginal differences among various hash function. |
| Proxy | Timeout | 25 ms | Based on network observations. |
| Proxy | Blackout Configuration | auto_eject_hosts: true<br>auto_eject_drop: false<br>server_failure_limit: 1<br>server_retry_timeout: 1000 | See description below with regard to FIG. 14b. |
| Webserver | Distribution | Random | Random avoids favoring some proxies over others due to hotkeys. It is also uses less CPU resources than modula or ketama, and because no key distribution occurs on the webserver level, there is little point to applying a hash function. |
| Webserver | Timeout | 50 ms | Best set to approximately twice that of the proxy machine due to two hops per each proxy hop. |
| Webserver | Blackout Configuration | Server_failure_limit: 1<br>server_retry_timeout: 1000 | Blackout timeouts are kept fairly short so that a webserver will not blackout all the proxies when a rolling restart occurs. |

FIGS. 13a-17 are graphical representations of CPU utilization and performance metrics when using various embodiments of the techniques and systems described herein.

Figure 13A:
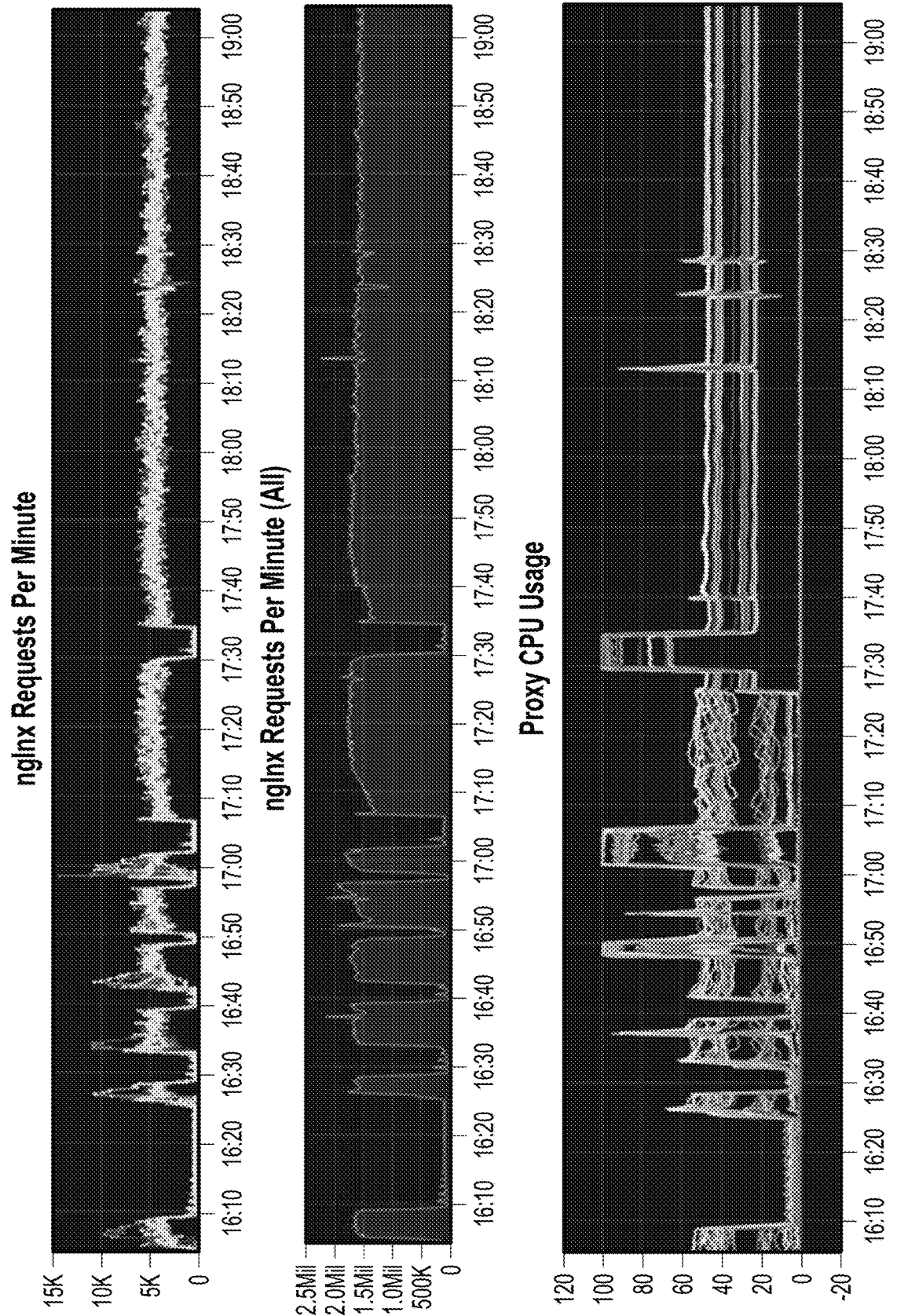
FIGS. 13a-17 illustrate CPU and server utilization and performance during the implementation of one or more of the embodiment of the invention.

Referring to FIG. 13a, conventional techniques are used to address a blackout host in the shard, resulting in a spike in CPU usage and a significant throttling of throughput, because the twemproxy instances are constantly attempting to reconnect to the unavailable cache database hosts. In such a scenario, without using the auto ejection setting, the twemproxy module will retry the connection to the unavailable cache database host for each request that lands on that shard. If the host is unresponsive, the request will hit the timeout time limit, blocking queued up requests from being fulfilled, causing a severe drop in throughput.

Figure 13B:
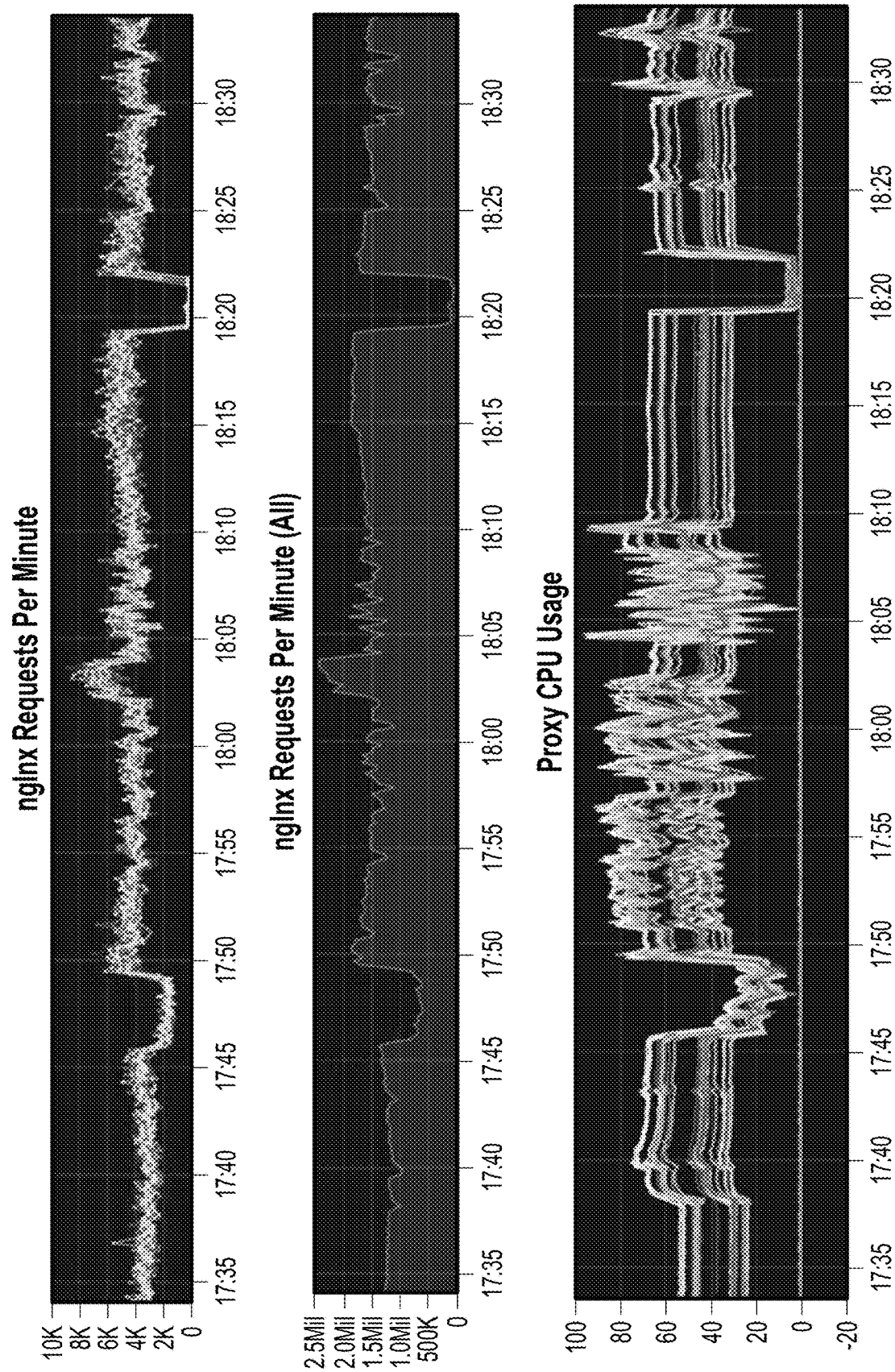

While setting 'auto_eject_hosts' to 'true' in the twemproxy configuration may alleviate this drop, the effect on sharding is undesirable. For example, with auto_eject_drop on, and a host is unresponsive, it is removed from the hash ring, so the keys destined for that host will be resharded onto the remaining machines in the cluster. As a result, if the machine is only partially unavailable, there can be cache inconsistencies because some twemproxies will be associated with an unreliable host and others will not. However, using the twemproxy architecture described herein along with the 'auto_eject_drop' option, the spike and throttling impact are avoided, as illustrated in FIG. 13b. More specifically, the purpose of the described configuration of the present invention is to address cache database host failures without having to remove the host from the cluster. This can happen, for example, if there are no backup hosts available or if a proxy failure prevents reconfiguration. Adding blackout configuration parameters allows the twemproxy instance to throttle the number of reconnection attempts to the unavailable cluster, and by setting the 'auto_eject_drop' option to 'false' prevents resharding when throttling these reconnection attempts.

In order to maximize throughput in the described failure scenario, 'server_failure_limit' and 'timeout' should be minimized with 'server_retry_timeout' maximized. However, 'timeout' has a lower bound that may be insufficient, and using a high server_retry_timeout also introduced unwanted effects. As each proxy machine 204 handles blackouts independently, there is a slight lag before all proxy machines 204 recognize the database host 206 as recovered, and some proxy machines 204 will reconnect faster than others, introducing a window of possible inconsistency. The size of the window can be managed by setting the 'server_retry_timeout' parameter appropriately, and the inconsistency can be reduced by retrying important requests such as 'set's on the client side.

In some embodiments, in which the goal is to maximize throughput in a failure case, server_failure_limit should be as low as possible (e.g., 1), and timeout should be as small as possible (e.g., a value greater than 0). However, timeout should not go too low, as it will prevent normal requests from completing successfully. Moreover, during times of higher latency, setting the timeout too low may lead to many requests failing when they would have in fact been processed without issue. In one particular embodiment, a timeout between 50-100 ms, and a server_failure_limit of 1 achieved a desirable balance. Settings for server_retry_timeout are similar, where the highest possible value is desired for a failure case, but in failover cases, a lower value is desired, because in failover, proxies are restarted in a rolling fashion. If the server_retry_timeout is too long, the traffic does not recover on the restarted proxies fast enough, which can lead to a temporary window where traffic is underserved. Server_retry_timeout works in conjunction with server_failure_limit, according to the following relationship:

$$\text{cumulative\_time\_lost\_rate} = \text{num\_web\_hosts} * \text{timeout} * (\text{server\_failure\_limit}/\text{server\_retry\_timeout})$$

which impacts average request latency, where:

$$\text{increase\_in\_request\_latency} = \text{cumulative\_time\_lost\_rate}/\text{requests\_rate}.$$

Various configuration settings may be used to balance the values, such that issues in failovers are minimized or eliminated, normal request times are not affected, and does not result in high latency increases during failure scenarios. In one embodiment, selecting a server_failure_limit of 1, a server_retry_timeout between 1000-2000, and a timeout between 50-100 achieved these goals. These configurations are set in the web twemproxy configs by modifying the configuration file and restarting the twemproxy instance. Other configuration settings are possible.

Figure 14:
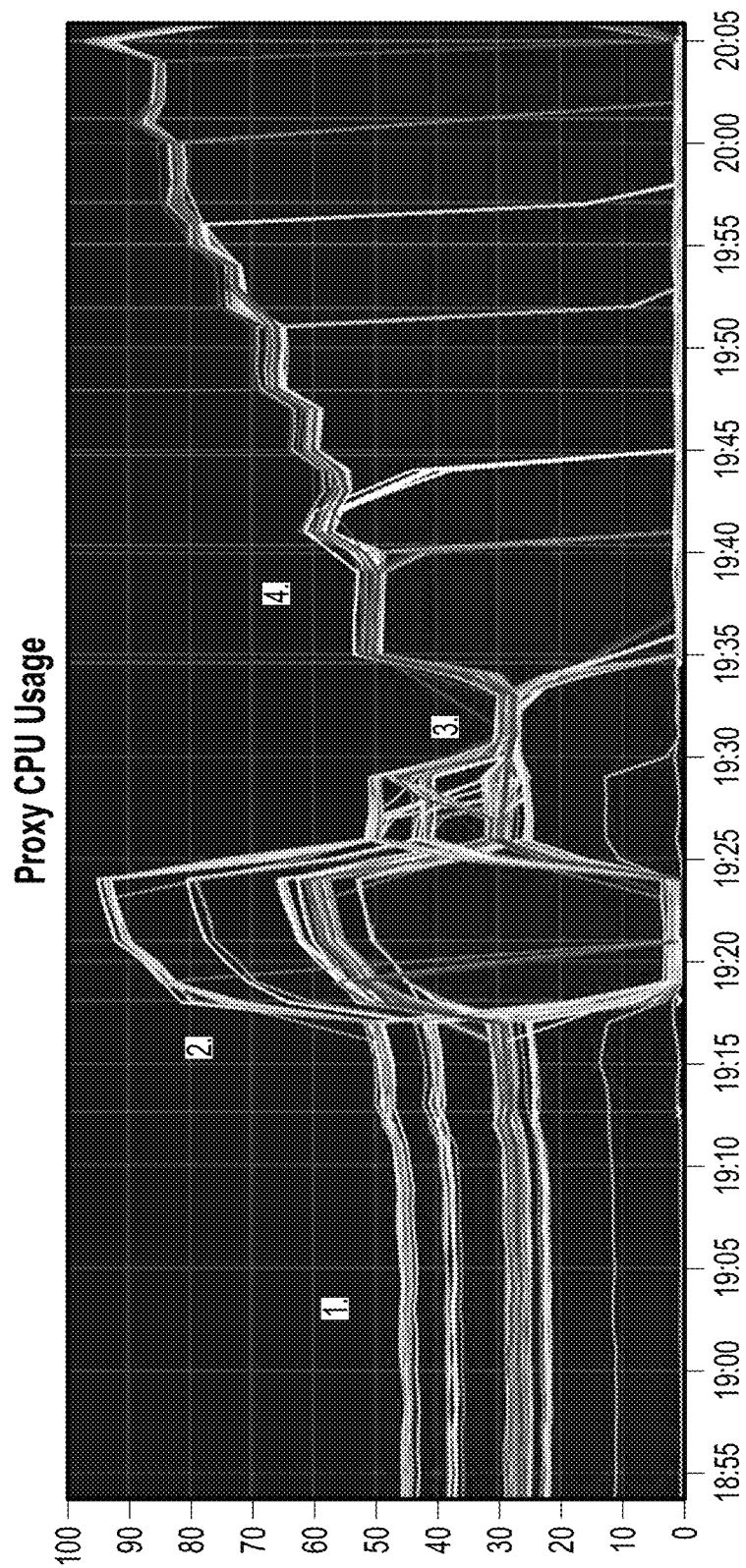

FIG. 14 illustrates the benefits of splitting interrupt request (IRQs) affinities across the remaining available CPUs during a host failure according to the present invention. IRQs are sent from the hardware level to the CPU, and while receiving the interrupt, the CPU will switch to interrupt context in order to handle the incoming interrupt. The affinity of an interrupt request (IRQ Affinity) is the set of CPU cores that can service that interrupt. To improve application scalability and latency, it is recommended to distribute IRQs between the available CPU cores, allowing a higher maximum throughput before any core fails. At point "1" in FIG. 14, without IRQ affinities set, CPU usage is uneven, even though CPU affinities are set for each. This reduces the capacity of the proxy cluster to the limitation of the most utilized CPU. At point "2" in FIG. 14, CPU limits are reached after approximately twelve proxy failures. At point "3," IRQ affinities are set, resulting in a more evenly distributed CPU usage profile. Point "4" illustrates how the CPUs can manage additional proxy failures without risking core failure.

Figure 15:
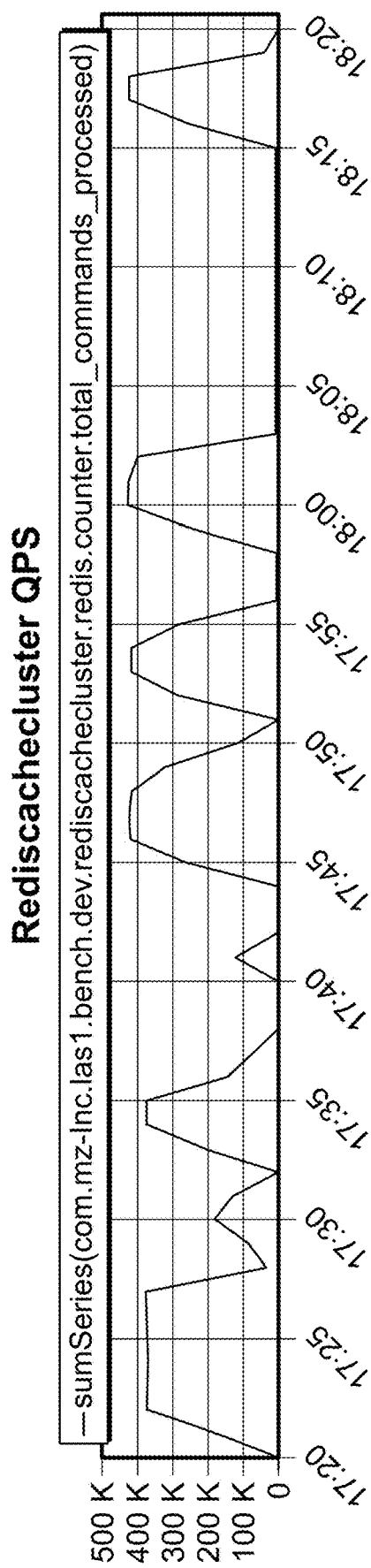

FIG. 15 illustrates proxy throughput as the number of proxy instances operating on a particular proxy machine 204 is increased from eight to ten according to the present invention. Given the absence of any noticeable impact, the number of proxy instances is not performance-constrained.

Figure 16:
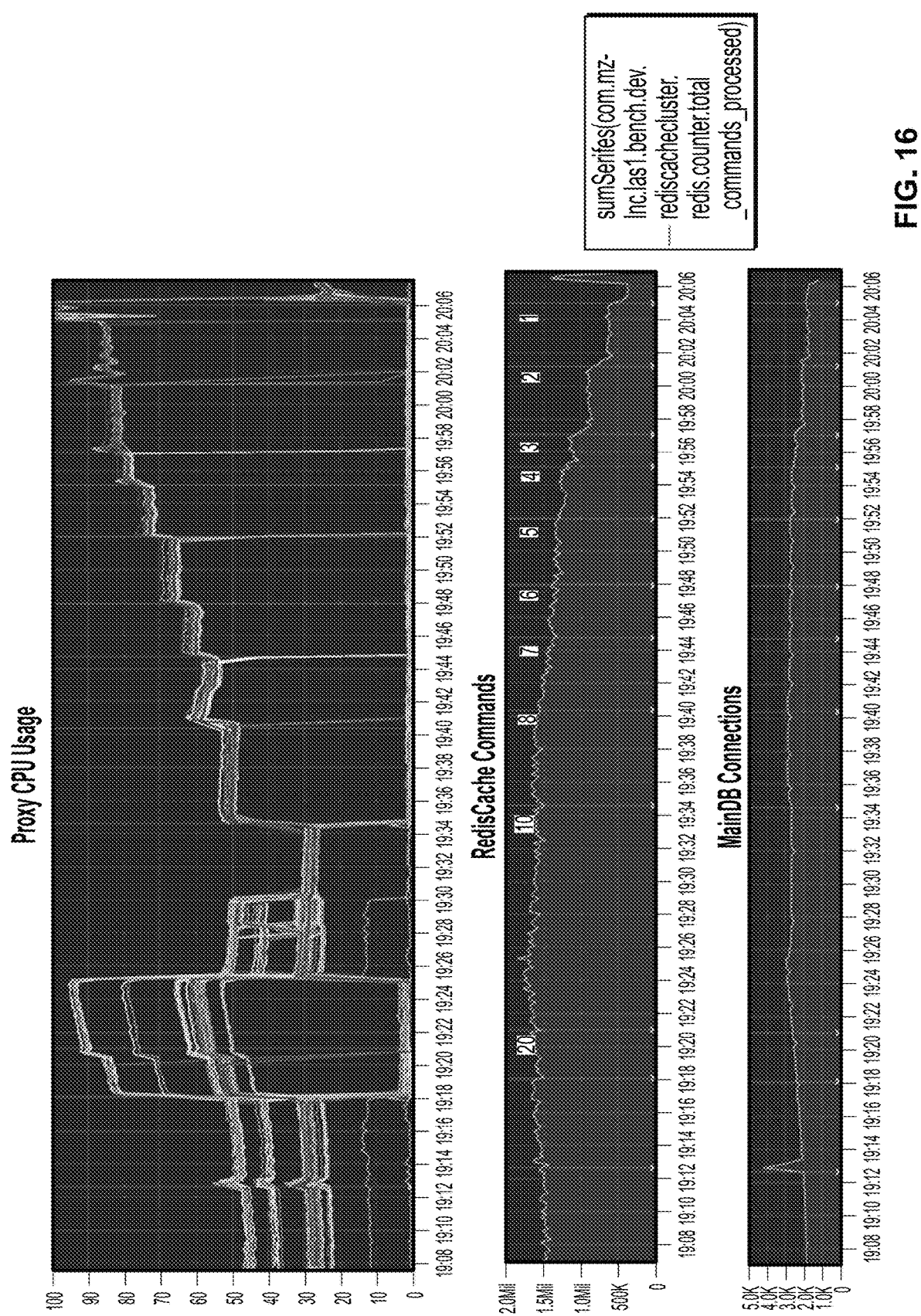

Ideally, the number of proxy machines 204 should be sufficient to handle traffic with half of the clusters in failure. Conversely, one possible downside of having too many proxy machines 204 is that it increases the chances of having a proxy machine 204 to fail at any given point in time. Even in cases where database hosts 206 cannot be replaced when down, proxy machines 204 can be added if needed. FIG. 16 illustrates CPU usage and throughout as additional proxy machines 204 are added using various configurations and techniques described above. Specifically, failures in the proxy cluster are applied, starting at 7:30 PM with the number of proxy machines 204 remaining alive decreasing from 20 to 10, then down to 1, driving more and more traffic to the remaining proxy machines 204. Noticeable decreases in throughput start occurring when the proxy cluster dwindles to eight proxy machines 204.

Figure 17:
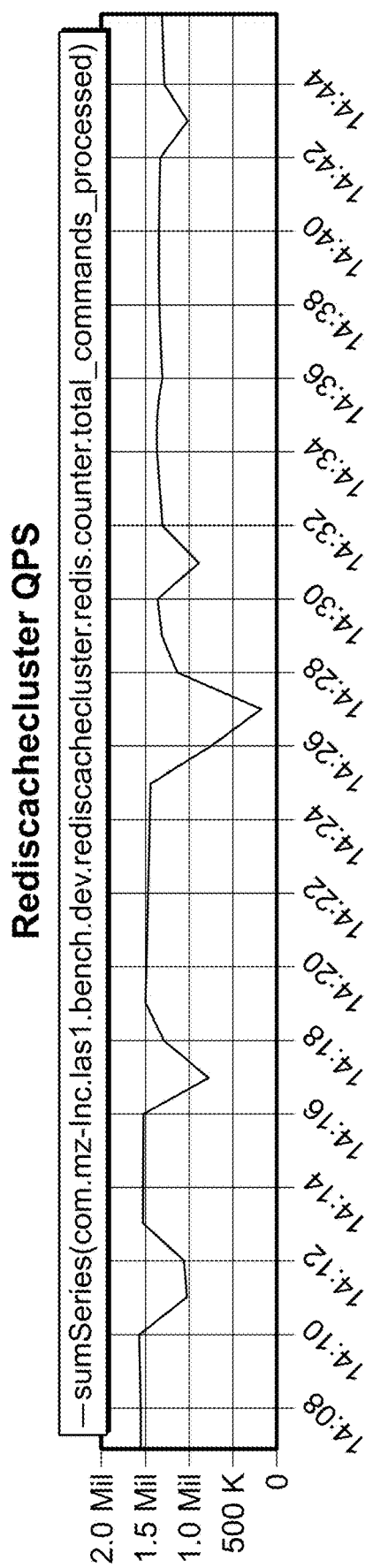

FIG. 17 illustrates CPU performance dips as rolling restarts are applied, and are exaggerated due to unthrottled proxy reconnection attempts. Various parameters of the trask monitor 212 can be appropriately set to address these performance impacts, such as follows, for example:

| Parameter | Recommended Setting | Description/Reason |
|---|---|---|
| Socket_timeout | 3 seconds | Should be set high enough such that trask has enough time to respond, even under load. |
| Rolling_restart_interval | 0 | Using a 1 second timeout for the webserver twemproxy results in no negative impact to setting to 0. Note that all twemproxy instances may not happen simultaneously, as the restarts still end up being rolling, because the trask monitors restart twemproxies instances serially. |
| Affinity_options | Start: 2; Delta: 1 | |
| Process_wait | 2 | Should be less than socket_timeout setting as it may take longer to restart CPUs. |
| Quorum | 5 | Cannot be larger than the number of proxy machines but greater than 1. Setting too low may falsely trigger replacements from proxy netsplits. |
| Down-after-milliseconds | 1000 | Determines how aggressively trask attempts to replace cache database hosts. A stable network permits a low number, but can be increased if the network becomes slow or shaky. |
| Logging Configuration | non zero maxBytes, non zero backupCount | |

Figure 18:
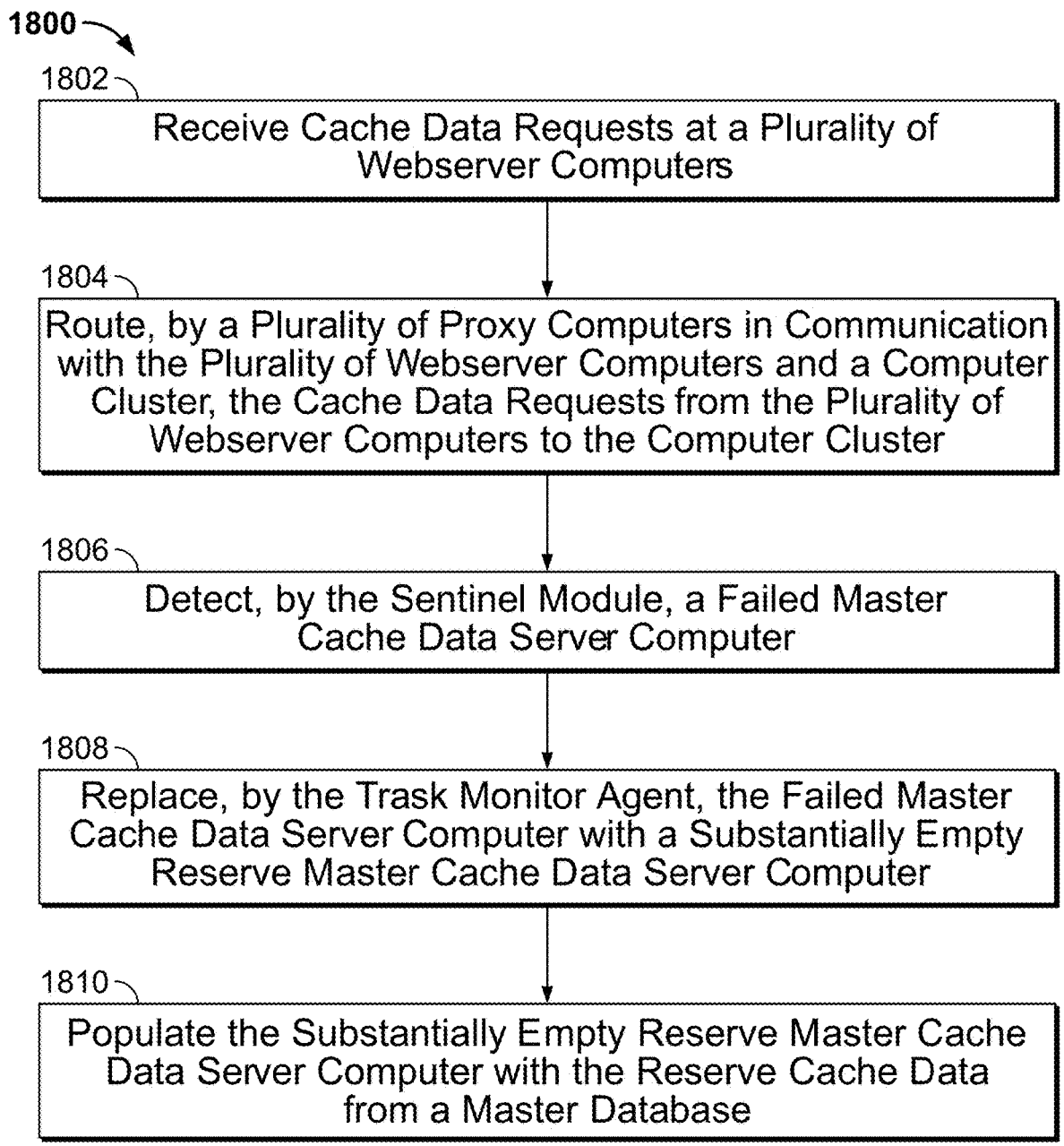
FIG. 18 is a flowchart of an example method of managing cache data in accordance with one embodiment of the invention.

FIG. 18 illustrates an example computer-implemented method 1800 of managing cache data. Cache data requests can be received at a plurality of webserver computers (step 1802). The cache data requests can be routed from the plurality of webserver computers to a computer cluster by a plurality of proxy computers in communication with the plurality of webserver computers and the computer cluster (step 1804). The computer cluster can comprise a plurality of master cache data server computers without a corresponding plurality of slave cache data server computers to store reserve cache data. Each proxy computer can comprise a sentinel module to monitor the health of the computer cluster, and a trask monitor agent to manager the computer cluster. A failed master cache data server computer can be detected by the sentinel module (step 1806). The failed master cache data server computer can be replaced by the trask monitor agent with a substantially empty reserve master cache data server computer (step 1808). The substantially empty reserve master cache data server computer can be populated with the reserve cache data from a master database (step 1810).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
receiving cache data requests at a computer cluster,
wherein the computer cluster comprises a plurality of master cache data server computers without a corresponding plurality of slave cache data server computers to store reserve cache data;
detecting a failed master cache data server computer;
replacing the failed master cache data server computer with an initially-empty reserve master cache data server computer; and
populating the initially-empty reserve master cache data server computer with the reserve cache data from a database.

2. The method of claim 1, comprising:
routing the cache data requests to the computer cluster by a plurality of proxy computers.

3. The method of claim 2, comprising:
establishing a connection between one of a plurality of webserver computers and one of the plurality of proxy computers upon receipt of a request for one of a plurality of cache keys.

4. The method of claim 3, comprising:
storing the plurality of cache keys at the master cache data server computers; and
serving a selected cache key upon receipt of the routed cache data requests.

5. The method of claim 1, comprising:
monitoring a health of the computer cluster.

6. The method of claim 1, comprising:
routing the cache data requests from cache data request modules of a plurality of webserver computers to one of the plurality of master cache data server computers.

7. The method of claim 1, comprising:
randomly routing the cache data requests among the plurality of master cache data server computers.

8. The method of claim 1, comprising:
monitoring a state of the plurality of master cache data server computers.

9. The method of claim 1, comprising:
subdividing the plurality of master cache data server computers into server pools.

10. The method of claim 9, wherein one or more initially-empty reserve master cache data server computers become operational to increase a size of the server pool.

11. A system, comprising:
one or more computer processors programmed to perform operations to:
receive cache data requests at a computer cluster,
wherein the computer cluster comprises a plurality of master cache data server computers without a corresponding plurality of slave cache data server computers to store reserve cache data;
detect a failed master cache data server computer;
replace the failed master cache data server computer with an initially-empty reserve master cache data server computer; and
populate the initially-empty reserve master cache data server computer with the reserve cache data from a database.

12. The system of claim 11, wherein the operations are further to:
route the cache data requests to the computer cluster by a plurality of proxy computers.

13. The system of claim 12, wherein the operations are further to:
establish a connection between one of a plurality of webserver computers and one of the plurality of proxy computers upon receipt of a request for one of a plurality of cache keys.

14. The system of claim 13, wherein the operations are further to:
store the plurality of cache keys at the master cache data server computers; and
serve a selected cache key upon receipt of the routed cache data requests.

15. The system of claim 11, wherein the operations are further to:
monitor a health of the computer cluster.

16. The system of claim 11, wherein the operations are further to:
route the cache data requests from cache data request modules of a plurality of webserver computers to one of the plurality of master cache data server computers.

17. The system of claim 11, wherein the operations are further to:
randomly route the cache data requests among the plurality of master cache data server computers.

18. The system of claim 11, wherein the operations are further to:
monitor a state of the plurality of master cache data server computers.

19. The system of claim 11, wherein the operations are further to:
subdivide the plurality of master cache data server computers into server pools.

20. A non-transitory computer-readable medium having instructions stored thereon that, when executed by one or more computer processors, cause the one or more computer processors to:
receive cache data requests at a computer cluster,
wherein the computer cluster comprises a plurality of master cache data server computers without a corresponding plurality of slave cache data server computers to store reserve cache data;
detect a failed master cache data server computer;
replace the failed master cache data server computer with an initially-empty reserve master cache data server computer; and
populate the initially-empty reserve master cache data server computer with the reserve cache data from a database.

* * * * *